United States Patent
Pertsel et al.

(10) Patent No.: US 10,609,341 B1
(45) Date of Patent: Mar. 31, 2020

(54) AUTOMATIC MAINTENANCE OF FRONT AND/OR REAR WINDSHIELD VISIBILITY

(71) Applicant: Ambarella, Inc., Santa Clara, CA (US)

(72) Inventors: Shimon Pertsel, Mountain View, CA (US); Alexander Fink, San Jose, CA (US); Didier LeGall, Los Altos, CA (US)

(73) Assignee: Ambarella, Inc., Santa Clara, CA (US)

( * ) Notice: Subject to any disclaimer, the term of this patent is extended or adjusted under 35 U.S.C. 154(b) by 256 days.

(21) Appl. No.: 15/822,672

(22) Filed: Nov. 27, 2017

Related U.S. Application Data

(63) Continuation of application No. 14/827,555, filed on Aug. 17, 2015, now Pat. No. 9,848,173.

(51) Int. Cl.
  *H04N 7/18* (2006.01)
  *B60S 1/02* (2006.01)
  *B60S 1/04* (2006.01)
  *G06T 7/00* (2017.01)
  *G06K 9/00* (2006.01)
  *G02B 27/00* (2006.01)

(52) U.S. Cl.
  CPC .............. *H04N 7/181* (2013.01); *B60S 1/023* (2013.01); *B60S 1/04* (2013.01); *G02B 27/0006* (2013.01); *G06K 9/00791* (2013.01); *G06T 7/0002* (2013.01); *G06T 7/0008* (2013.01); *G06T 2207/10016* (2013.01); *G06T 2207/30252* (2013.01)

(58) Field of Classification Search
  CPC ........... H04N 7/181; B60S 1/023; B60S 1/04; G02B 27/0006; G06K 9/00791; G06T 7/0002; G06T 7/0008; G06T 2207/10016; G06T 2207/30252
  USPC .......................................................... 701/36
  See application file for complete search history.

(56) References Cited

U.S. PATENT DOCUMENTS

| | | | | |
|---|---|---|---|---|
| 9,848,173 | B1 * | 12/2017 | Pertsel ................... | H04N 7/181 |
| 2005/0254688 | A1 * | 11/2005 | Franz .................... | B60S 1/0822 |
| | | | | 382/104 |
| 2006/0157639 | A1 * | 7/2006 | Shaffer ..................... | B60S 1/08 |
| | | | | 250/208.1 |
| 2007/0227718 | A1 * | 10/2007 | Hill .................... | B60H 1/00785 |
| | | | | 165/231 |

(Continued)

*Primary Examiner* — Paula L Schneider
(74) *Attorney, Agent, or Firm* — Christopher P. Maiorana, PC

(57) ABSTRACT

An apparatus comprising an interface and a processing circuit. The interface may be configured to receive (a) a video signal based on a targeted view in a vehicle and (b) one or more status signals from one or more sensors of the vehicle. The processing circuit may be configured to (A) analyze the video signal received from the interface and (B) detect a type of obstruction of a window of the vehicle visible in the video signal in response to (i) a classification of information in the video signal and (ii) one or more of the status signals. The processing circuit may (a) determine a confidence level for the type of obstruction, (b) activate one or more corrective measures when the confidence level is above a pre-defined threshold and (c) adjust the confidence level based on a response of the obstruction to the corrective measures.

20 Claims, 13 Drawing Sheets

(56) References Cited

U.S. PATENT DOCUMENTS

2014/0241589 A1* 8/2014 Weber ............... G06K 9/00791
 382/108
2016/0090039 A1* 3/2016 Tan .................... G06K 9/00791
 348/148

* cited by examiner

AUTOMATIC MAINTENANCE OF FRONT AND/OR REAR WINDSHIELD VISIBILITY

This application relates to U.S. Ser. No. 14/827,555, filed Aug. 17, 2015, which is incorporated by reference in its entirety.

FIELD OF THE INVENTION

The present invention relates to video capture devices generally and, more particularly, to a video capture device used to control automatic maintenance of front and/or rear windshields to improve visibility.

BACKGROUND OF THE INVENTION

One of the issues that drivers face when driving in various weather conditions is front windshield visibility. Poor front windshield visibility can be caused by dirt, by windshield glass freezing or by condensation on the windshield glass, or a "foggy windshield". Drivers will usually handle poor visibility issues by either using wipers to clean the glass from the outside (in the case of dirt or glass freezing) or by using the temperature controls of the vehicle to heat the windshield above the dew point to clean condensation from the windshield. Clearing a "foggy windshield" is repeated as the glass becomes "foggy" again during driving, reducing visibility and distracting the driver from operating the vehicle. Reduced visibility and distracted driving pose a safety risk. Some conventional designs to improve visibility use dedicated humidity sensors to detect condensation. Such designs are expensive and have not achieved wide adoption.

It would be desirable to implement an automatic maintenance of front/rear windshield visibility that uses information from a video capture device that is cost effective.

SUMMARY OF THE INVENTION

The present invention concerns an apparatus comprising a camera sensor and a processor. The camera sensor may be configured to generate a video signal based on a targeted view in a vehicle. The processor may be configured to receive one or more status signals from one or more sensors. The processor may be configured to detect a type of obstruction of a window of the vehicle visible in the video signal based on (i) a classification of information in the video signal and (ii) one or more of the status signals.

The objects, features and advantages of the present invention include providing a video capture device that may (i) control maintenance of a front/rear windshield, (ii) use a shared video processor to reduce implementation costs, (iii) analyze video to detect conditions and initiate corrective measures, (iv) integrate information from vehicle sensors to diagnose a cause of a visibility obstruction and/or (v) be easy to implement.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Figure 1:
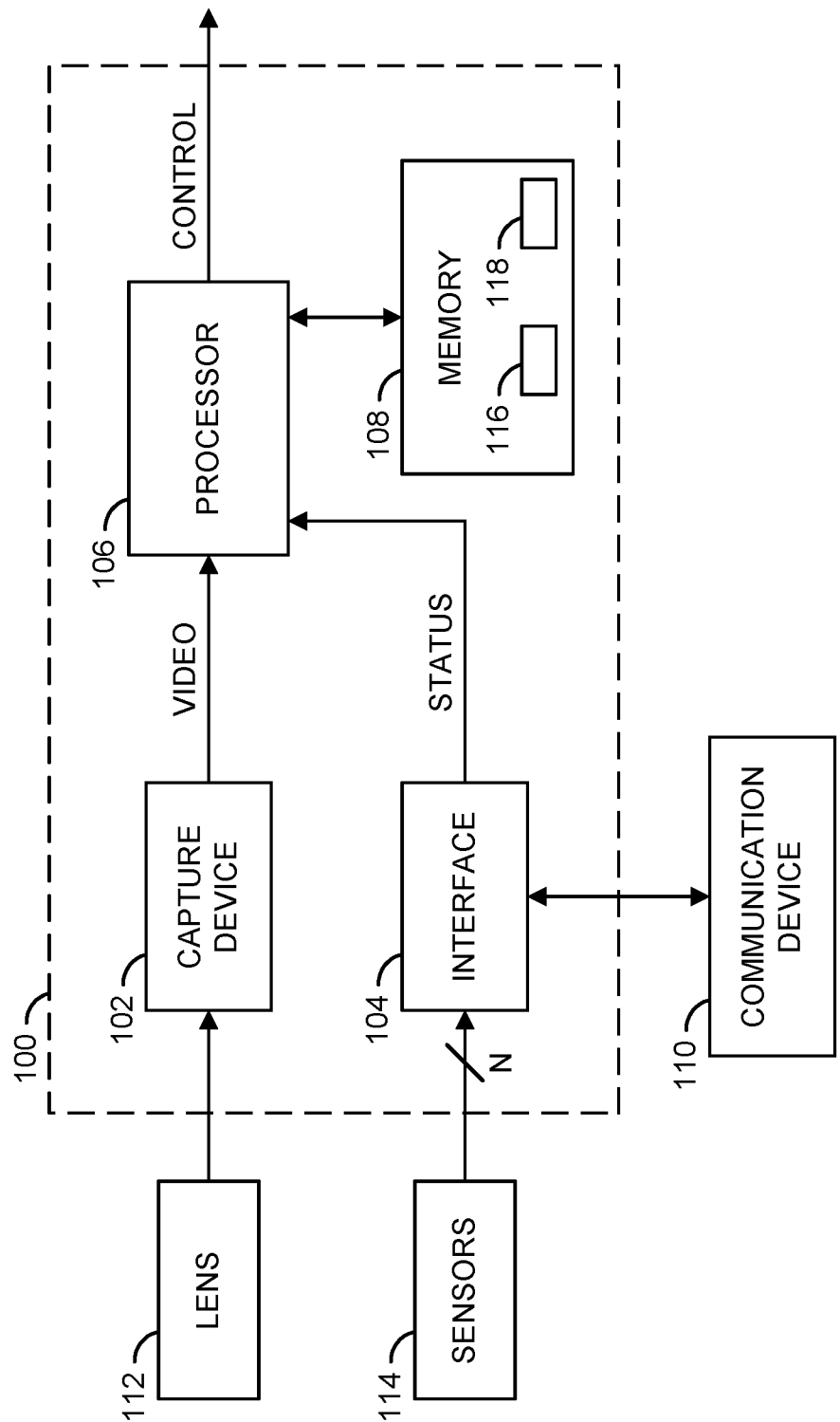
FIG. 1 is a block diagram of an example embodiment of an apparatus.

Referring to FIG. 1, a block diagram of an apparatus 100 is shown in accordance with an embodiment of the present invention. The apparatus 100 may be a camera system. The camera system 100 may comprise a block (or circuit) 102, a block (or circuit) 104, a block (or circuit) 106 and/or a block (or circuit) 108. The circuit 102 may implement a capture device. The circuit 104 may implement an interface. The circuit 106 may be configured as a processor. The circuit 108 may be configured as a memory. The memory 108 may be configured to store computer readable/executable instructions (or firmware). The instructions, when executed by the processor 106, may perform a number of steps.

The apparatus 100 is shown connected to a block (or circuit) 110 and/or a block (or circuit) 114. The circuit 110 may be an external communication device. The circuit 114 may be implemented as one or more sensors (e.g., a location module such as a GPS sensor, an orientation module such as a magnetometer, a temperature sensor, etc.). Generally, the sensors 114 may be input/output devices separate from the capture device 102. In some embodiments, the communication device 110 and/or the sensors 114 may be implemented as part of the camera system 100 (e.g., internal components of the camera system 100). In some embodiments, the communication device 110 and/or the sensors 114 may be components available to the camera system 100 (e.g., pre-installed components of a vehicle).

The memory 108 is shown comprising a block (or circuit) 116 and a block (or circuit) 118. The circuit 116 may be configured as a lookup table. The circuit 118 may be a data storage portion of the memory 108. The memory 108 may comprise other portions (e.g., instructions, free memory, application-specific storage, shared memory, etc.). The type of data stored in the memory 108 may be varied according to the design criteria of a particular implementation.

The apparatus 100 is shown receiving input from a block (or circuit) 112. The block 112 may be a lens (e.g., a camera lens). In some embodiments, the lens 112 may be implemented as part of the apparatus 100. The components implemented in the apparatus 100 may be varied according to the design criteria of a particular implementation. In some embodiments, the apparatus 100 may be implemented as a drop-in solution (e.g., installed as one component).

The capture device 102 may present a signal (e.g., VIDEO) to the processor 106. The interface 104 may present a signal (e.g., STATUS) to the processor 106. The interface 104 is shown receiving data from the sensors 114. The processor 106 may be configured to receive the signal VIDEO, the signal STATUS and/or other signals. The signal STATUS may present status information received from the sensors 114. The processor 106 may be configured to generate a signal (e.g., CONTROL). The inputs, outputs and/or arrangement of the components of the camera system 100 may be varied according to the design criteria of a particular implementation.

The apparatus 100 may be implemented as a regular digital camera and/or a depth-sensing camera. The sensors 114 may comprise a GPS, a magnetometer, a temperature sensor, a humidity sensor, etc. The sensors 114 may be implemented on-board the camera system 100 and/or connected externally (e.g., via the interface 104). The processor 106 may analyze the captured video content (e.g., the signal VIDEO) in real time to detect objects and/or obstructions (to be described in more detail in association with FIGS. 3-13).

Figure 2:
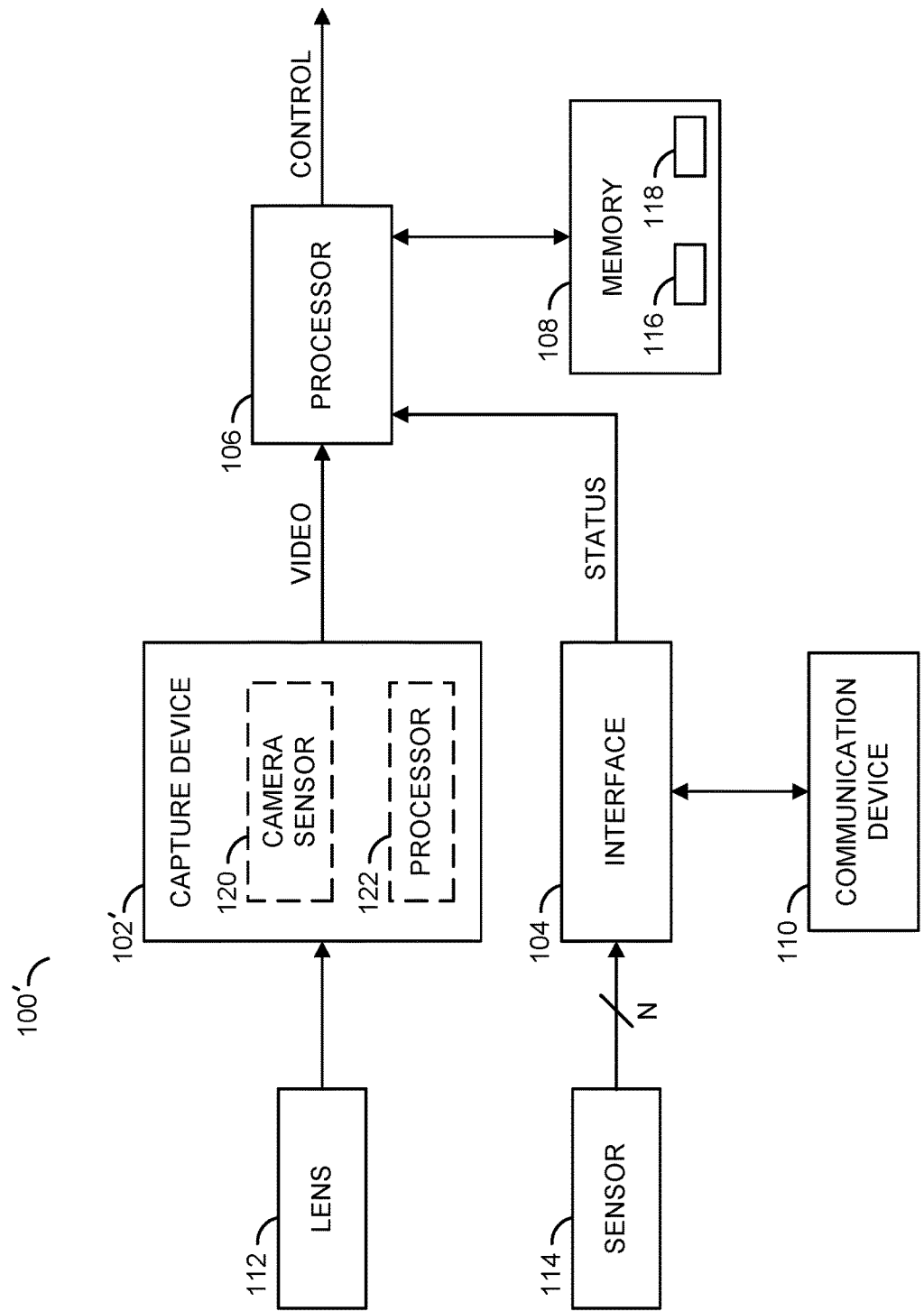
FIG. 2 is a block diagram of another example embodiment of an apparatus.

Referring to FIG. 2, a block diagram of the apparatus 100' is shown in accordance with an embodiment of the present invention. The camera system 100' may comprise the capture device 102', the interface 104, the processor 106, the memory 108, the communication device 110, the lens 112 and/or the sensors 114. The camera system 100' may be a distributed system (e.g., each component may be implemented separately throughout an installation location such as a vehicle). The capture device 102' may comprise a block (or circuit) 120 and/or a block (or circuit) 122. The circuit 120 may be a camera sensor (e.g., a camera sensor separate from the sensors 114). The circuit 122 may be a processor (e.g., a processor separate from the processor 106). The capture device 102' may implement a separate internal memory (e.g., a memory separate from the memory 108 such as a frame buffer).

Figure 3:
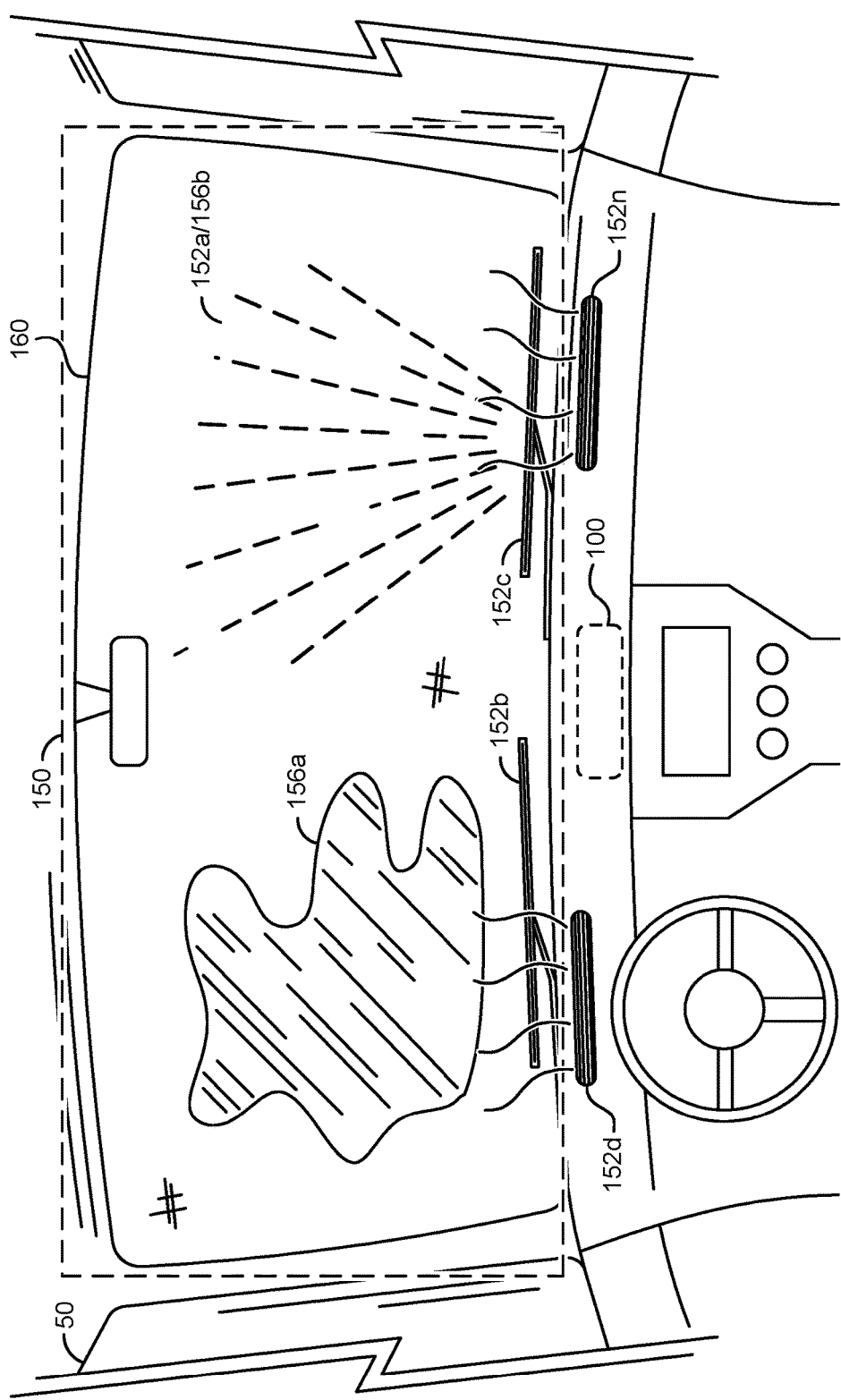
FIG. 3 is a diagram illustrating obstructions and corrective measures for a front windshield.

Referring to FIG. 3, a diagram illustrating obstructions and corrective measures in a frame 150. A vehicle 50 is shown having a windshield 160. The windshield 160 is in the video frame 150. The frame 150 is shown as a targeted view from the vehicle 50. The frame 150 shows obstructions 156a-156b. The obstructions 156a-156b may be examples of various types of obstructions (e.g., obstructions 156a-156n). Corrective measures 152a-152n are shown. The number and/or types of the obstructions 156a-156n and/or the corrective measures 152a-152n may be varied according to the design criteria of a particular implementation.

The obstructions 156a-156n may reduce a visibility through a window of the vehicle 50 (e.g., through the windshield 160). An amount of the reduction in visibility may be related to the type of obstruction. In one example, the obstruction 156a may be ice (e.g., frost on the windshield 160). In another example, the obstruction 156a may be fog (e.g., fog outside of the vehicle 50). In yet another example, the obstruction 156a may be dirt (e.g., mud splashed on the windshield). In still another example, the obstruction 156b may be water (e.g., washer fluid). One or more of the corrective measures 152a-152n may be applied to the windshield 160 to remove the obstruction 156a and/or reduce visibility loss caused by the obstruction 156a.

The corrective measures 152a-152n may be automatic responses by the vehicle 50 to counteract the obstructions 156a-156n. The corrective measure 152a is shown as washer fluid. For example, washer fluid (e.g., anti-freeze) may be used to clean dirt and/or ice from the windshield 160. The corrective measures 152b-152c are shown as windshield wipers. For example, the wipers 152b-152c may be used to clean dirt, ice and/or rain from the windshield 160. The corrective measures 152d-152n are shown as being air vents (e.g., air vents for the heating/cooling system of the vehicle 50). The air vents 152d-152n may be opened and/or aimed to release cold/hot air for the windshield 160. For example, the air vents 152d-152n may be used to eliminate frost and/or condensation from the windshield 160.

In some embodiments, the corrective measures 152a-152n may also be one of the obstructions 156a-156n. For example, the washer fluid 152a/156b may be the corrective measure 152a in response to mud, but the washer fluid 152a/156b may also be the obstruction 156b that causes a reduction in visibility. The wipers 152b-152c may need to be activated to remove the washer fluid 152a/156b.

The capture device 102 may be configured to capture video image data (e.g., from the lens 112). In some embodiments, the capture device 102 may be a video capturing device such as a camera. In some embodiments, the capture device 102 may be a component of a camera (e.g., a camera pre-installed at a fixed location such as a security camera). The capture device 102 may capture data received through the lens 112 to generate a bitstream (e.g., generate video frames). For example, the capture device 102 may receive light from the lens 112. The lens 112 may be directed, panned, zoomed and/or rotated to provide a targeted view of the vehicle 50 (e.g., a field of view).

The capture device 102 may transform the received light into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). For example, the video data may be a digital video signal. The digital video signal may comprise video frames (e.g., sequential digital images).

The video data of the targeted view of the vehicle 50 may be represented as the signal/bitstream/data VIDEO (e.g., a digital video signal). The capture device 102 may present the signal VIDEO to the processor 106. The signal VIDEO may represent the video frames/video data (e.g., the video frame 150). The signal VIDEO may be a video stream captured by the capture device 102. In some embodiments, the capture device 102 may be implemented in the camera. In some embodiments, the capture device 102 may be configured to add to existing functionality of the camera.

In some embodiments, the capture device 102 may be pre-installed at a pre-determined location and the camera system 100 may connect to the capture device 102. In other embodiments, the capture device 102 may be part of the camera system 100. The capture device 102 may be configured for driver monitoring, security monitoring, passenger monitoring, for insurance purposes, etc. For example, the capture device 102 may be implemented to detect break-ins and/or vandalism. In another example, the capture device 102 may detect accidents to provide evidence for insurance claims.

The capture device 102 may be configured to detect faces in a region of a video frame. In some embodiments, the capture device 102 may be configured to recognize faces through facial recognition (e.g., based on faces stored in the memory 108). In some embodiments, the capture device 102 may be configured to detect objects and classify the objects as a particular type of obstruction. The camera system 100 may be configured to leverage pre-existing functionality of the pre-installed capture device 102. The implementation of the capture device 102 may be varied according to the design criteria of a particular implementation.

In some embodiments, the capture device 102' may implement the camera sensor 120 and/or the processor 122. The camera sensor 120 may receive light from the lens 112 and transform the light into digital data (e.g., the bitstream). For example, the camera sensor 120 may perform a photoelectric conversion of the light from the lens 112. The processor 122 may transform the bitstream into a human-legible content (e.g., video data). For example, the processor 122 may receive pure (e.g., raw) data from the camera sensor 120 and generate (e.g., encode) video data based on the raw data (e.g., the bitstream). The capture device 102' may have a memory to store the raw data and/or the processed bitstream. For example, the capture device 102' may implement a frame memory and/or buffer to store (e.g., provide temporary storage and/or cache) one or more of the video frames (e.g., the digital video signal). The processor 122 may perform analysis on the video frames stored in the memory/buffer of the capture device 102'.

In some embodiments the capture device 102' may be configured to determine a location of the obstructions 156a-156n. For example, the processor 122 may analyze the captured bitstream (e.g., using machine vision processing), determine a location of the detected obstructions 156a-156n and present the signal VIDEO (e.g., comprising information about the location of the detected obstructions 156a-156n) to the processor 106. The processor 122 may be configured to determine the location of the detected obstructions 156a-156n (e.g., less analysis is performed by the processor 106). In another example, the processor 122 may generate the signal VIDEO comprising video frames and the processor 106 may analyze the video frames to determine the location of the detected obstructions 156a-156n (e.g., more analysis is performed by the processor 106). The analysis performed by the processor 122 and/or the processor 106 may be varied according to the design criteria of a particular implementation.

In some embodiments, the processor 122 may be implemented as a local processor for the camera system 100 and the processor 106 may be implemented as an external processor (e.g., a processor on a device such as a server on a server farm). The processor 122 may be configured to combine the signal VIDEO and the signal STATUS for storage in the memory 108 (e.g., embed the status information, objects/obstructions 156a-156n and/or metadata associated with the video frames in the video file as a text track, control channel, RTP stream, etc.). The camera system 100' may be configured to transmit the signal VIDEO with embedded status information to an external device (e.g., a device on an external network). The external device may have an external version of the processor 106 configured to perform the detection of the obstructions 156a-156n and/or the determination of the corrective measures for the detected obstructions 156a-156n.

The interface 104 may receive data from one or more of the sensors 114. The signal STATUS may be generated in response to the data received from the sensors 114 at a time of generation of the signal VIDEO. In some embodiments, the interface 104 may receive data from a location module. In some embodiments, the interface 104 may receive data from an orientation module. In some embodiments, the interface 104 may receive data from a temperature module.

In some embodiments, the interface 104 may receive weather information scraped from an external source (e.g., a weather service and/or website). In some embodiments, the interface 104 may receive data from the processor 106 and/or the communication device 110. The interface 104 may send data (e.g., instructions) from the processor 106 to connected devices via the communications device 110. For example, the interface 104 may be bi-directional.

In the examples shown (e.g., in FIG. 1 and FIG. 2), information from the sensors 114 (e.g., the location module, the orientation module, the temperature module, etc.) may be received by the interface 104. In one example, where the camera system 100 is installed in a vehicle, the interface 104 may be implemented as an electronic bus (e.g., a controller area network (CAN) bus) and the sensors 114 may be part of the vehicle. In another example, the interface 104 may be implemented as an Ethernet interface. In yet another example, the interface 104 may be implemented as an electronic device (e.g., a chip) with a CAN bus controller. In some embodiments, the sensors 114 may connect directly to the processor 106 (e.g., the processor 106 may implement a CAN bus controller for compatibility, the processor 106 may implement a serial peripheral interface (SPI), the processor 106 may implement another interface, etc.). In some embodiments, the sensors 114 may connect to the memory 108.

The processor 106 may be configured to execute computer readable code and/or process information. The processor 106 may be configured to receive input and/or present output to the memory 108. The processor 106 may be configured to present and/or receive other signals (not shown). The number and/or types of inputs and/or outputs of the processor 106 may be varied according to the design criteria of a particular implementation.

In some embodiments, the processor 106 may receive the signal VIDEO from the capture device 102 and detect the objects 156a-156n in the video frame. In some embodiments, the processor 122 may be configured to detect the obstructions 156a-156n and the processor 106 may receive the location (or coordinates) of the detected obstructions 156a-156n in the video frame from the capture device 102'. In some embodiments, the processor 106 may be configured to analyze the video frame (e.g., the signal VIDEO). The processor 106 may be configured to detect a location and/or position of the detected obstructions 156a-156n in the video frame.

The processor 106 may determine a type of the detected obstructions 156a-156n based on a classification. The classification may be based on information from the signal VIDEO (e.g., object detection) and/or information from the signal STATUS (e.g., environmental factors). For example, the color histogram and/or the high frequency component of the signal VIDEO may be compared to some known reference. In another example, temperature and/or humidity information may be provided by the signal STATUS. The processor 106 may rule out and/or increase a likelihood of certain types of obstructions. For example, the classification may comprise a confidence level for a particular hypothesis (or diagnosis) for the cause of visibility reduction.

A high confidence level for a particular type of obstruction may indicate that evidence (e.g., from the signal VIDEO and/or STATUS) is consistent with the particular type of obstruction. A low confidence level for a particular type of obstruction may indicate that evidence (e.g., from the signal VIDEO and/or STATUS) is inconsistent with the particular type of obstruction. Various checks may be performed to determine the confidence level. The corrective measures 152a-152n may be activated when a confidence level is above a pre-defined threshold. The implementation of the classification to determine the type of obstruction may be varied based on the design criteria of a particular implementation.

Based on the location and/or the classification of the detected obstructions 156a-156n in the video frame (e.g., the signal VIDEO), the processor 106 may determine the appropriate response and/or corrective measure for the type of the obstructions 156a-156n. The corrective measures 152a-152n for the detected obstructions 156a-156n may be based on the signal VIDEO and/or the signal STATUS. The processor 106 may generate the signal CONTROL in response to the determined corrective measures 152a-152n for the detected obstructions 156a-156n. The corrective measures 152a-152n may be an automatic response by the vehicle 50.

The signal CONTROL may be implemented to provide an activation for the corrective measures 152a-152n in response to the classification of the obstructions 156a-156n. For example, the signal CONTROL may be sent to the interface 104 in order to activate the appropriate device to initiate the corrective measure (e.g., windshield wipers, conductive resistors, washer fluid, fog lights, etc.). Generally the signal CONTROL may correspond to the type of the classified obstructions 156a-156n.

The utilization of the data stored in the signal CONTROL may be varied according to the design criteria of a particular implementation. In some embodiments, the signal CONTROL may be presented to the communication device 110 and the communication device 110 may pass the signal CONTROL to an external network and/or external storage. For example, if the obstruction 156a-156n is a cracked or smashed windshield, the signal CONTROL may be sent to a roadside assistance service (e.g., a towing service, emergency services, etc.), an insurance provider and/or a mechanic.

The processor 106 and/or the processor 122 may be implemented as an application specific integrated circuit (e.g., ASIC) or a system-on-a-chip (e.g., SOC). The processor 106 and/or the processor 122 may be configured to determine a current size, shape and/or color of the obstructions 156a-156n (e.g., to perform a classification). The processor 106 and/or the processor 122 may detect one or more of the detected objects 156a-156n in each video frame. In some embodiments, the processor 106 and/or the processor 122 may receive video signals from multiple cameras and/or image sensors.

The processor 106 and/or the processor 122 may determine a number of pixels (e.g., a width, a height and/or a depth) comprising the detected obstructions 156a-156n in the video frame. Based on the number of pixels of each of the detected objects 156a-156n in the video frame, the processor 106 and/or the processor 122 may estimate a classification of the detected obstructions 156a-156n. Whether the detection of the objects 156a-156n is performed by the processor 106 and/or the processor 122 may be varied according to the design criteria of a particular implementation.

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to the detected obstructions 156a-156n, reference objects, a video file, status information (e.g., readings from the sensors 114) and/or metadata information.

For example, the memory 108 (e.g., the lookup table 116) may store a reference size (e.g., the number of pixels of an object of known size in a video frame at a known distance) of the objects 156a-156n. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frame) of the objects 156a-156n. The reference size, shape and/or colors stored in the memory 108 may be used to compare the current size of the detected obstructions 156a-156n in a current video frame. The comparison of the size of the detected obstructions 156a-156n in the current video frame and the reference size, shape and/or color may be used to estimate a classification of the obstructions 156a-156n.

The memory 108 may store the pre-determined location of the camera system 100 and/or a pre-determined field of view of the camera system 100 (e.g., when the camera system 100 is implemented as a fixed view camera). The memory 108 may store reference data for the obstructions 156a-156n. For example, the memory 108 may store reference color histograms for various known types of obstructions. In another example, the memory 108 may store previously capture frames (e.g., a reference image from when a car was parked and turned off). The type of reference information stored by the memory 108 may be varied according to the design criteria of a particular implementation.

The memory 108 may store the lookup table 116. The lookup table 116 stored in the memory 108 may comprise reference information. The lookup table may allow the signal VIDEO and/or the signal STATUS to be compared to and/or cross-referenced with some known set of data. Generally, the lookup table 116 may be implemented to index precalculated values to save computation time. For example, the lookup table 116 may store temperature values, dew point values and/or humidity values. The detected temperature and/or humidity values may be compared to values in the lookup table 116 to perform a classification of the obstructions 156a-156n and/or activate one of the corrective measures 152a-152n. In one example, data values for the lookup table 116 may be scraped (e.g., using the communication device 110) from a weather service. In another example, data values for the lookup table 116 may be precalculated (e.g., during an idle time of the processor 106).

The communication device 110 may send and/or receive data to/from the interface 104. In some embodiments, when the camera system 100 is implemented as a vehicle camera, the communication device 110 may be the OBD of the vehicle. In some embodiments, the communication device 110 may be implemented as a satellite (e.g., a satellite connection to a proprietary system). In one example, the communication device 110 may be a hard-wired data port (e.g., a USB port, a mini-USB port, a USB-C connector, HDMI port, an Ethernet port, a DisplayPort interface, a Lightning port, etc.). In another example, the communication device 110 may be a wireless data interface (e.g., Wi-Fi, Bluetooth, ZigBee, cellular, etc.).

The lens 112 (e.g., a camera lens) may be directed to provide a targeted view of the vehicle 50 and/or the environment (e.g., a field of view from the camera sensor 102 and/or an external camera sensor). In one example, the lens 112 may be mounted on a dashboard of the vehicle 50. In another example, the lens 112 may be wearable camera (e.g., a camera worn by a police officer, a camera worn by a race car driver, a camera worn by a first responder, a camera worn by a thrill-seeker, etc.). The lens 112 may be aimed to capture environmental data (e.g., light). The lens 112 may be configured to capture and/or focus the light for the capture device 102. Generally, the sensor 120 is located behind the lens 112. Based on the captured light from the lens 112, the capture device 102 may generate a bitstream and/or video data.

The sensors 114 may be configured to determine a location and/or an orientation of the camera system 100. The number and/or types of data used to determine the location and/or orientation of the camera system 100 may be varied according to the design criteria of a particular implementation. In one example, the location module may be used to determine an absolute location of the camera system 100. In another example, the orientation module may be used to determine an orientation of the camera system 100. Other types of sensors may be implemented. For example, a temperature module may be implemented to determine an inside and/or an outside temperature for the vehicle 50. Sensors on the windshield may be used to determine the inside temperature of the glass of the windshield 160. In another example, a humidity sensor may be implemented to determine a humidity level of the environment.

Data from the sensors 114 may be presented to the processor 106 as the signal STATUS. The number and/or types of the sensors 114 may be varied according to the design criteria of a particular implementation. The sensors 114 may be used by the camera system 100 to determine (e.g., confirm a likelihood) a type of the obstructions 156a-156n (e.g., confirm classifications).

The sensors 114 (e.g., the location module, the orientation module and/or the other types of sensors) may be configured to determine an absolute location and/or an azimuth orientation of the camera system 100. The absolute location and/or the azimuth orientation of the camera system 100 may be added to the detected relative location of the obstructions 156a-156n to determine an absolute location (e.g., coordinates) of the obstructions 156a-156n. The absolute location of the vehicle 50 and/or the absolute location of the obstructions 156a-156n may be used to determine the type of the obstruction 156a-156n.

The signal STATUS may provide information for the camera system 100 (e.g., the status information). In one example, location information may be determined by the location module (e.g., to determine weather conditions for the current location of the vehicle 50). For example, the location module may be implemented as a GPS sensor. Orientation information may be determined by the orientation module. For example, the orientation module may be implemented as a magnetometer, an accelerometer and/or a gyroscope. In yet another example, temperature information may be determined by the temperature module. For example, the temperature module may be implemented as a thermometer.

The types of sensors used to implement the location module, the orientation module, the temperature module and/or any other types of sensors may be varied according to the design criteria of a particular implementation. In some embodiments, the signal STATUS may provide details about the camera system 100 (e.g., camera specifications, camera identity, the field of view 204, date, time, etc.).

Figure 4:
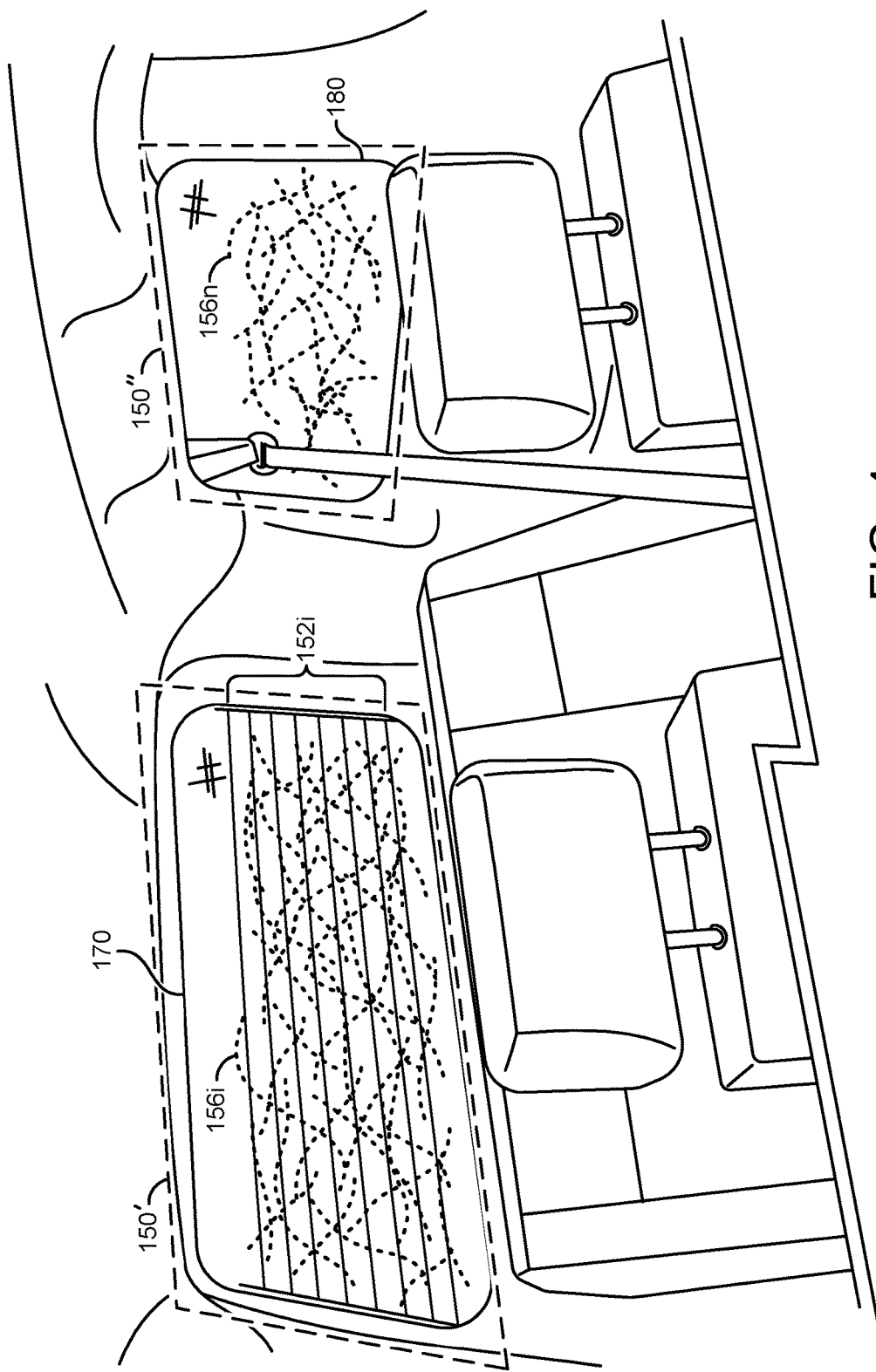
FIG. 4 is a diagram illustrating frost reducing visibility of a rear windshield and a side window of a vehicle.

Referring to FIG. 4, a diagram illustrating a frame 150' and a frame 150" is shown. The frame 150' may show details of a rear windshield 170. The frame 150" may also show details of a side window 180. The rear windshield 170 is shown having frost 156i. The frost 156i reduces visibility of the rear windshield 170. The side window 180 is shown having frost 156n. The frost 156n reduces visibility of the side window 180.

The camera system 100 may use information from the rear windshield 170 and/or the side window 180 to infer a classification of the type of obstruction on another window (e.g., the front windshield 160). For example, the frost 156i detected on the rear windshield 170 and/or the frost 156n detected on the side window 180 may increase the confidence level of a detection of frost on the front windshield 160 (e.g., all windows are likely to be obstructed when frost is the cause of the reduction in visibility). In another example, if the obstruction on the windshield 160 is caused by mud and/or dirt, the rear windshield 170 and/or the side window 180 may not have a similar obstruction.

The rear windshield 170 is shown having one of the corrective measures 152a-152n (e.g., 152i). The corrective measure 152i may be implemented as resistive conductors in or on the glass of the rear windshield 170 (e.g., defrost rails). Similar resistive conductors may be implemented on the front windshield 160 (or portions of the front windshield 160, such as where the windshield wipers 152b-152c rest). Further examples of the corrective measures 152a-152n may be implemented on the other windows 170 and/or 180. For example, the rear windshield 170 may be configured to have a washer fluid nozzle and/or a wiper blade. The types of corrective measures implemented for each of the windows of the vehicle 50 may be varied according to the design criteria of a particular implementation.

Figure 5:
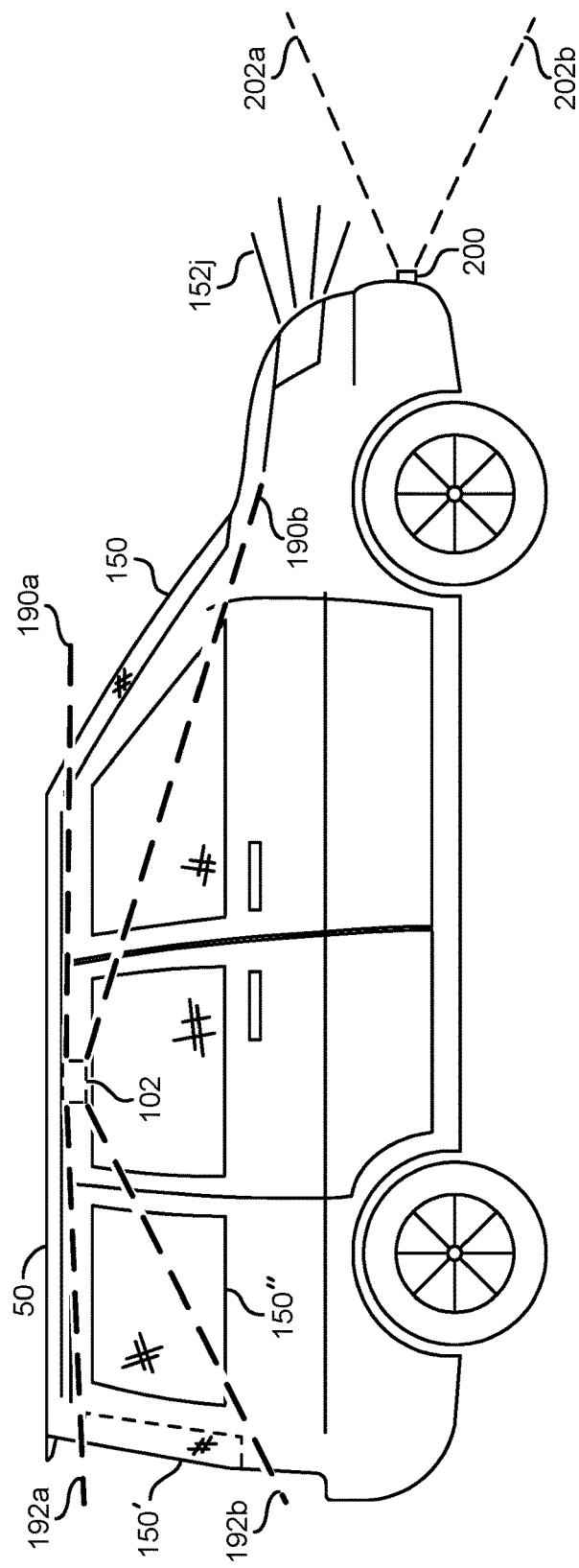
FIG. 5 is a diagram of various camera angles.

Referring to FIG. 5, a side view of the automobile 50 is shown. The sensor 102 is shown having an angle 190a and an angle 190b (e.g., a field of view) that points toward the frame 150. The field of view from the angle 190a and the angle 190b may provide a targeted view of the vehicle 50. The sensor 102 is also shown having an angle 192a and an angle 192b (e.g., a field of view) that points toward the frame 150'. The field of view from the angle 192a and the angle 192b may provide a targeted view of the vehicle 50. The sensor 102 may also point at the frame 150". The frame 150, the frame 150' and the frame 150" show images of the various windshields and/or windows of the vehicle 50.

The vehicle 50 may have an external camera sensor 200. The external sensor 200 may provide a targeted view from the vehicle 50 (e.g., a front view camera providing a targeted view in front of the windshield 160, a rear-view camera, a side-view camera, etc.). The external camera sensor 200 may be similar to the camera sensor 102. For example, the external camera 200 may have a separate sensor from the camera system 100 and/or provide a second video signal. The external camera sensor 200 is shown having an angle 202a and an angle 202b (e.g., a field of view) that points away from the vehicle 50. The field of view from the angle 202a-202b may provide a targeted view from the vehicle 50. In some embodiments, the external camera sensor 200 may be directed towards the vehicle 50. The implementation of the external camera sensor 200 may be varied according to the design criteria of a particular implementation.

The external camera sensor 200 may be used by the processor 106 to compare an obstruction detected by the processor 106 on one of the windows of the vehicle. For example, if the processor 106 detects an obstruction on the windshield 160 that may be caused by fog, the external camera sensor 200 may be used to confirm that the obstruction is fog (e.g., both the windshield 160 and the external camera sensor 200 detect the same obstruction). In another example, if the obstruction is caused by dirt, the windshield 160 may have an obstruction, but the external camera sensor 200 may not have the obstruction.

One of the corrective measures 152a-152n (e.g., 152j) is shown on the vehicle 50. The corrective measure 152j is shown as activated (e.g., flashing) headlights (or high beams or fog lights). The corrective measure 152j may be used to in response to a detected obstruction (e.g., fog). In some embodiments, the corrective measure 152j may be used to determine (e.g., test a diagnosis or hypothesis) the type of obstruction 156a-156n. For example, the headlights 152j may be activated in order for the camera system 100 to detect a response of the obstructions 156a-156n due to reflections caused by the headlights 152j.

Figure 6:
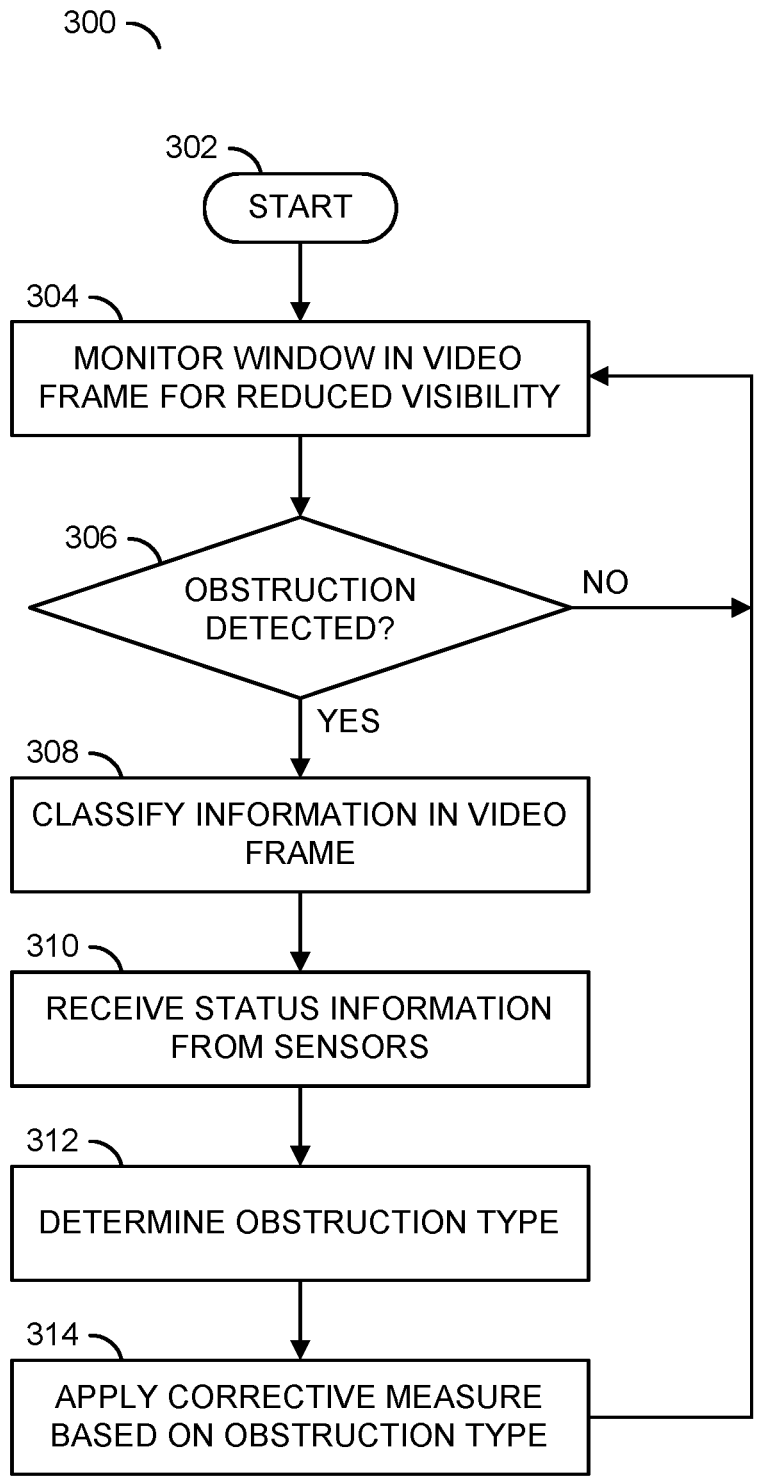
FIG. 6 is a flow diagram illustrating a method for applying a corrective measure based on an obstruction type.

Referring to FIG. 6, a method (or process) 300 is shown. The method 300 may apply a corrective measure based on an obstruction type. The method 300 generally comprises a step (or state) 302, a step (or state) 304, a decision step (or state) 306, a step (or state) 308, a step (or state) 310, a step (or state) 312, and a step (or state) 314. The steps 302-314 may be performed by the processor 106 in response to computer executable instructions stored in the memory 108.

The step 302 starts the method 300. The step 304 monitors the window 160 in the video frame 150 to determine reduced visibility. Next, the decision step 306 determines whether an obstruction 156 has been detected. If not, the method 300 moves back to the step 304. If so, the method 300 moves to the step 308. The step 308 classifies information in the video frame 150. The step 310 receives status information from the sensors 114. Next, the step 312 determines a type of the obstruction 156. Next, the step 314 applies corrective measures based on the type of the obstruction 156. The method 300 then moves back to the step 304.

Figure 7:
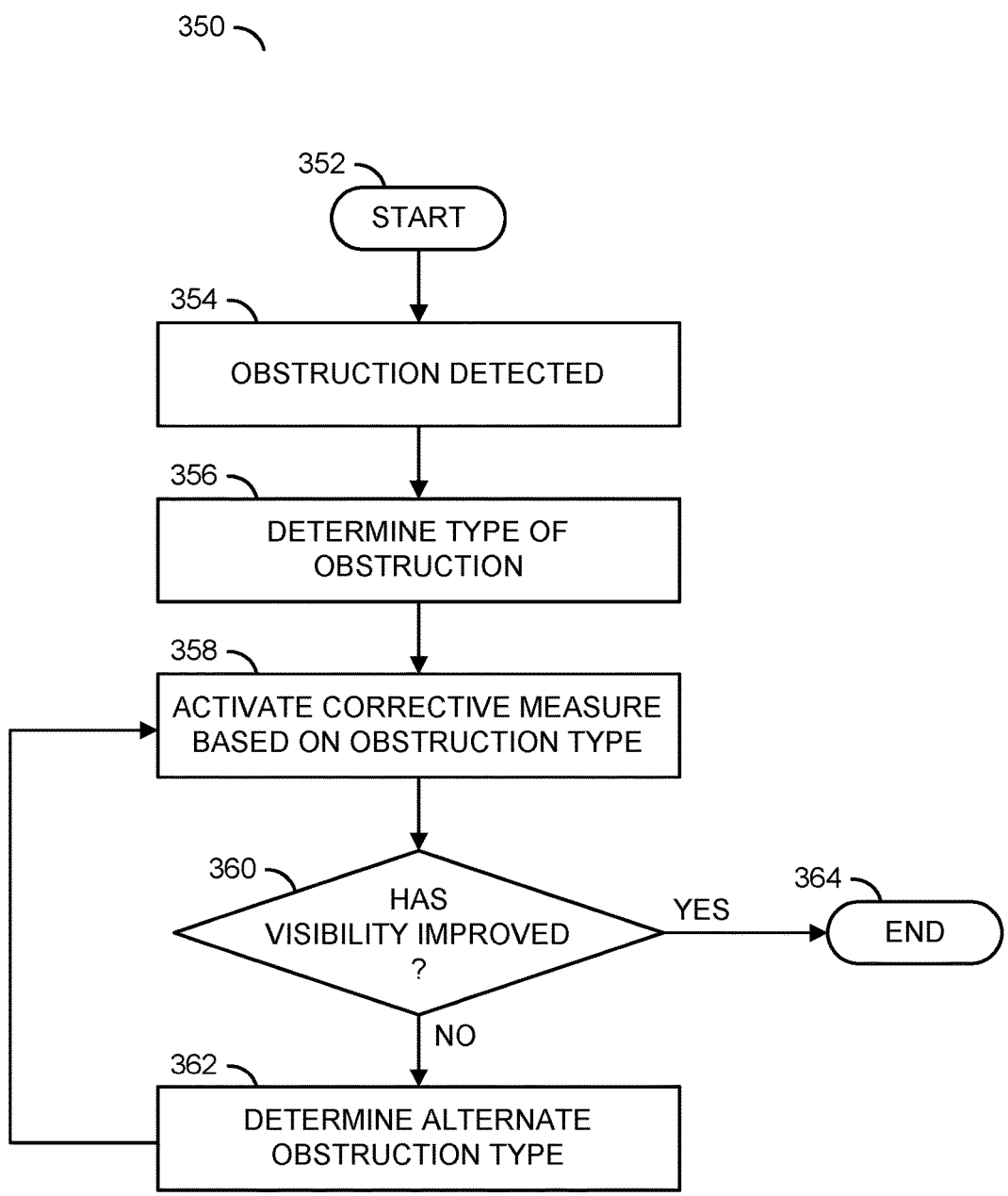
FIG. 7 is a flow diagram illustrating a method for an iterative application of corrective measures.

Referring to FIG. 7, a method (or process) 350 is shown. The method 350 may be an iterative application of corrective measures. The method 350 generally comprises a step (or state) 352, a step (or state) 354, a step (or state) 356, a step (or state) 358, a decision step (or state) 360, a step (or state) 362, and a step (or state) 364. The steps 352-364 may be performed by the processor 106 in response to computer executable instructions stored in the memory 108.

The step 352 starts the method 350. Next, the step 354 determines whether an obstruction has been detected. Next, the step 356 determines the type of obstruction. Next, the step 358 activates one or more corrective measures based on the type of the obstruction 156 detected. Next, the decision step 360 determines whether visibility has improved. If so, the method 350 moves to the step 364, which ends the method 350. If visibility has not improved, the method 350 moves to the step 362. The step 362 determines an alternate obstruction type. The method 350 then moves back to the step 358.

Figure 8:
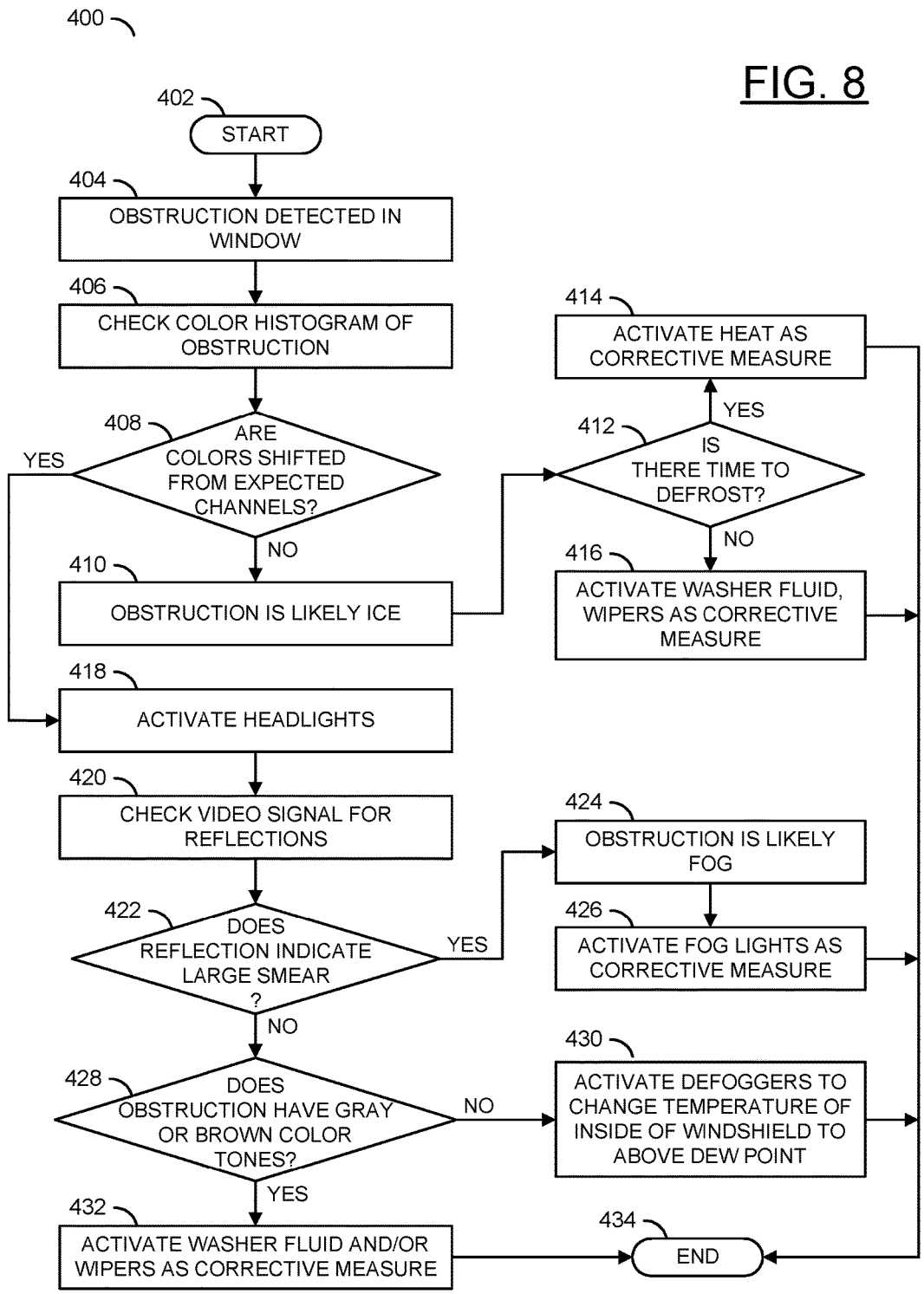
FIG. 8 is a flow diagram illustrating an example of an iterative determination of an obstruction type.

Referring to FIG. 8, a method (or process) 400 is shown. The method 400 may be an example of an iterative determination of an obstruction type. The method 400 generally comprises a step (or state) 402, a step (or state) 404, a step (or state) 406, a decision step (or state) 408, a step (or state) 410, a decision step (or state) 412, a step (or state) 414, a step (or state) 416, a step (or state) 418, a step (or state) 420, a decision step (or state) 422, a step (or state) 424, a step (or state) 426, a decision step (or state) 428, a step (or state) 430, a step (or state) 432, and a step (or state) 434. The steps 402-434 may be performed by the processor 106 in response to computer executable instructions stored in the memory 108.

The state 402 may start the method 400. The state 404 may detect one of the obstructions 156a-156n in the window 160 (or the windows 170, 180, etc.). Next, the state 406 may check a color histogram of the obstructions 156a-156n. Next, the decision state 408 determines if the colors are shifted from expected channels (e.g., the color histogram of the image may be compared to some reference such as an the external camera 200, a view of the environment stored in the memory 108 (e.g., an image/video taken earlier when the car was parked, before the vehicle 50 was turned off, from the external camera 200 and/or an image/video from a similar time of day), a reference obstruction, etc.). If not, the method 400 moves to the state 410.

The state 410 determines the obstruction may likely be ice (e.g., the confidence level associated with ice may be increased and/or the confidence level associated with water may be increased). Next, the method 400 may move to the decision state 412. The decision state 412 may determine if there is enough time to defrost the windshield (e.g., using a slower corrective measure such as activating heat through the vents 152d-152n). If so, the method 400 may move to the state 414. If not, the method 400 may move to the state 416. The state 414 may activate heat to de-ice the windshield (e.g., a primary defogger such as heat through the vents 152d-152n and/or a secondary defogger such as the defrost rails 152i) as the corrective measure. Next, the method 400 may move to the state 434. The state 416 may activate the washer fluid 152a, the wipers 152b-152c and/or the defrost rails 152i as the corrective measure. Next, the method 400 may move to the state 434.

If the decision state 408 determines the colors are shifted from the expected channels, the method 400 may move to the state 418 (e.g., the confidence level for ice may be decreased). The state 418 may activate the headlights 152j of the vehicle 50. The state 420 may check the signal VIDEO for reflections (e.g., a response of the obstructions 156a-156n in response to the corrective measure 152j). Next, the method 400 may move to the decision state 422.

If the decision state 422 determines the reflection indicates a large smear (e.g., the obstructions 156a-156n are shown as a large smear), the method 400 may move to the state 424. The state 424 may determine the obstruction may likely be fog (e.g., increase the confidence level associated with fog). In the state 426, fog lights of the vehicle 50 may be activated as one of the corrective measures 152a-152n. After the state 426, the method 400 may move to the state 434. If the decision state 422 determines that the reflection does not indicate a large smear, the method 400 may move to the decision state 428 (e.g., the confidence level for fog may be decreased).

If the decision state 428 determines the obstruction does not have gray or brown color tones, the method 400 may move to the state 430 (e.g., the confidence level associated with condensation may increase and/or the confidence level associated with mud/dirt may decrease). The state 430 may activate defoggers (e.g., using the air vents 152d-152n) to change a temperature of the inside of the windshield 160 to above the dew point. Next, the method 400 may move to the state 434. If the decision state 428 determines the obstruction does have gray or brown color tones, the method 400 may move to the state 432 (e.g., the confidence level associated with mud/dirt may increase and/or the confidence level for condensation may decrease). The state 432 may activate the washer fluid 152a and/or the wipers 152b-152c as the corrective measure. Next, the method 400 may move to the state 434. The state 434 may end the method 400.

The camera sensor 102 inside the vehicle 50 may be used to automate the process that a driver normally performs manually. The camera sensor 102 may be implemented as a camera sensor configured to see a targeted view of the windshield 160 from inside the vehicle 50. The camera sensor 102 may be implemented as a dash camera, a driver assistance camera, an interior security camera, etc. Since the same process can be applied for the rear windshield 170, or the side window 180, a driver monitoring camera may be used.

The apparatus 100 may be used to detect poor visibility in the vehicle 50. The apparatus 100 may be used to detect "fog" or other poor visibility conditions. The apparatus 100 may use the processor 106 to analyze a histogram and/or a high frequency component of the frame 150 (or 150' or 150") to detect the obstructions 156a-156n. For example, a color histogram may be compared to a reference color histogram to see if the detected colors are shifted compared to reference colors (e.g., no shift in color may indicate ice, a shift to a whiter than usual color may indicate fog and/or condensation, etc.). In another example, the high frequency component may be used to detect details such as sharp edges to indicate whether or not a blur is detected (e.g., a blur caused by fog). In yet another example, gray and/or brown color tones may indicate dirt and/or mud rather than condensation. The apparatus 100 may be used with modern driver assistance cameras to incorporate computer vision algorithms that may be used to detect a variety of objects in the scene and/or poor visibility (e.g., obstructions that reduce and/or limit visibility from inside the vehicle 50).

In order to start one or more countermeasures (e.g., the corrective measures 152a-152n), the apparatus 100 may determine whether an obstruction is frozen glass, dirty glass, foggy glass outside fog, etc. (e.g., classify the obstruction 152a-152n). Rain/snow may be detected in modern cars, which have automatic wiper control and/or through computer vision means. Detecting the type of obstruction 152a-152n may be done by implementing one or more procedures or checks. For example, if the temperature inside the vehicle 50 is above a likely dew point, the window may not be "foggy".

A dew point may be calculated in response to sensor inputs (e.g., status information from the sensors 114) such as air temperature and/or relative humidity measurements. For example, the sensors 114 may provide inputs (e.g., the status information) that may be approximated either through available humidity sensors and/or GPS location/weather data. The obstructions 156a-156n may be classified based on the status information. For example, if the temperature outside is sufficiently above freezing, the window 160 is not frozen.

A dew point may be determined based on a measure of atmospheric moisture. Generally, the dew point is a temperature that dew will form when the air temperature falls sufficiently. When temperatures are below freezing, the dew point may be a frost point (e.g., the point at which ice may form the obstruction on the windshield). In some embodiments, the camera system 100 may calculate the dew point and/or frost point (based on information received from the sensors 114). The dew point and/or frost point may be stored in the lookup table 116 of the memory 108. For example, the lookup table 116 may store dew point values based on air temperature and relative humidity values. The air temperature value and the relative humidity value may be cross-referenced to point to a precalculated dew point temperature. In some embodiments, the dew point and/or frost point may be received from an external service (e.g., a weather provider) using the communication device 110.

Figure 9:
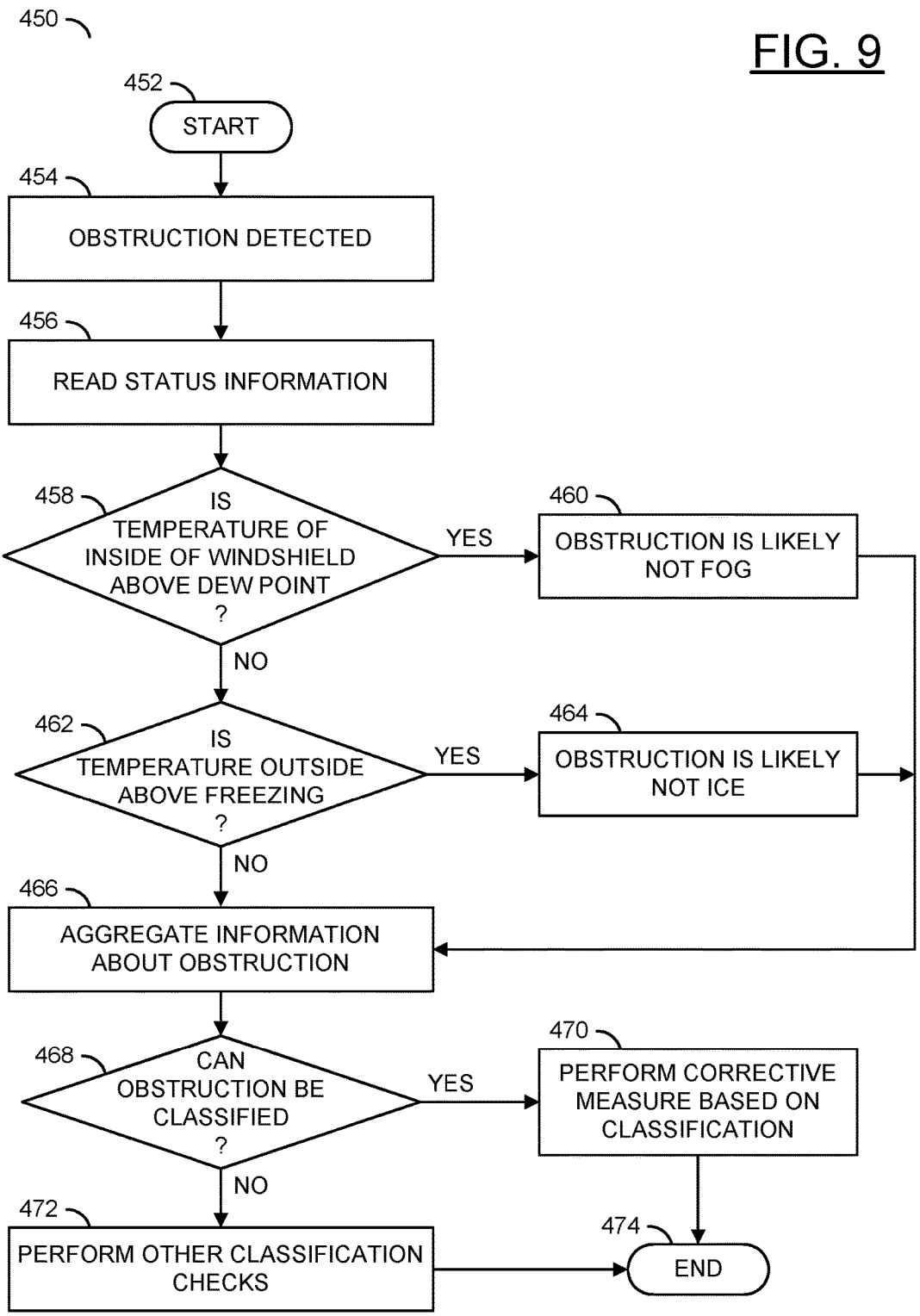
FIG. 9 is a flow diagram illustrating an example of classifying a type of obstruction based on a temperature check.

Referring to FIG. 9, a method (or process) 450 is shown. The method 450 may be an example of classifying a type of obstruction based on a temperature check. The method 450 generally comprises a step (or state) 452, a step (or state) 454, a step (or state) 456, a decision step (or state) 458, a step (or state) 460, a decision step (or state) 462, a step (or state) 464, a step (or state) 466, a decision step (or state) 468, a step (or state) 470, a step (or state) 472, and a step (or state) 474. The steps 452-474 may be performed by the processor 106 in response to computer executable instructions stored in the memory 108.

The state 452 may start the method 450. In the state 454, the camera system 100 may detect one or more of the obstructions 156a-156n. In the state 456, the processor 106 may read the status information (e.g., a temperature reading). Next, the method 450 may move to the decision state 458.

If the decision state 458 determines the temperature of the inside of the windshield 160 is above the dew point, the method 450 may move to the state 460. In the state 460, the classification of the obstructions 156a-156n may be considered likely to not be fog (e.g., the confidence level associated with fog may be decreased). Next, the method 450 may move to the state 466. If the decision state 458 determines the temperature of the inside of the windshield 160 is not above the dew point, the method 450 may move to the decision state 462.

If the decision state 462 determines the temperature outside is above freezing, the method 450 may move to the state 464. In the state 464, the classification performed by the processor 106 may determine the obstructions 156a-156n are not likely to be ice (e.g., the confidence level associated with ice may be decreased and/or the confidence level associated with fog may be increased). Next, the method 450 may move to the state 466. If the decision state 462 determines the temperature outside is not above freezing, the method 450 may move to the state 466 (e.g., the confidence level associated with ice may be increased).

The state 466 may aggregate information about the obstructions 156a-156n (e.g., the processor 106 may aggregate information from one or more checks performed as described in FIGS. 9-13). Next, the method 450 may move to the decision state 468. If the decision state 468 determines the obstructions 156a-156n can be classified, the method 450 may move to the state 470. The state 470 may perform one or more of the corrective measures 152a-152n based on the classification. Next, the method 450 may move to the state 474. If the decision state 468 determines the obstructions 156a-156n cannot be classified, the method 450 may move to the state 472. The state 472 may perform other classification checks. Next, the method 450 may end at the state 474.

The speed of deterioration of visibility (or a change in the obstruction) may also be used to calculate an appropriate corrective measure. For example, if the visibility declines quickly during driving, then the windshield 160 may not be frozen. Quick deterioration may indicate the obstruction is likely "foggy" glass and/or outside fog. Computer vision may also be used to calculate the corrective measures 152a-152n.

The processor 106 may be used to assess the likelihood of each type of problem (e.g., obstruction) by analyzing the way the glass looks. Based on the assessment, the obstruction may be classified (e.g., a type of the obstruction 152a-152n may be determined). For example, a dirty window may likely have darker colors and/or a very non-uniform image. In another example, a strong fog may likely be brighter and/or more uniform.

Figure 10:
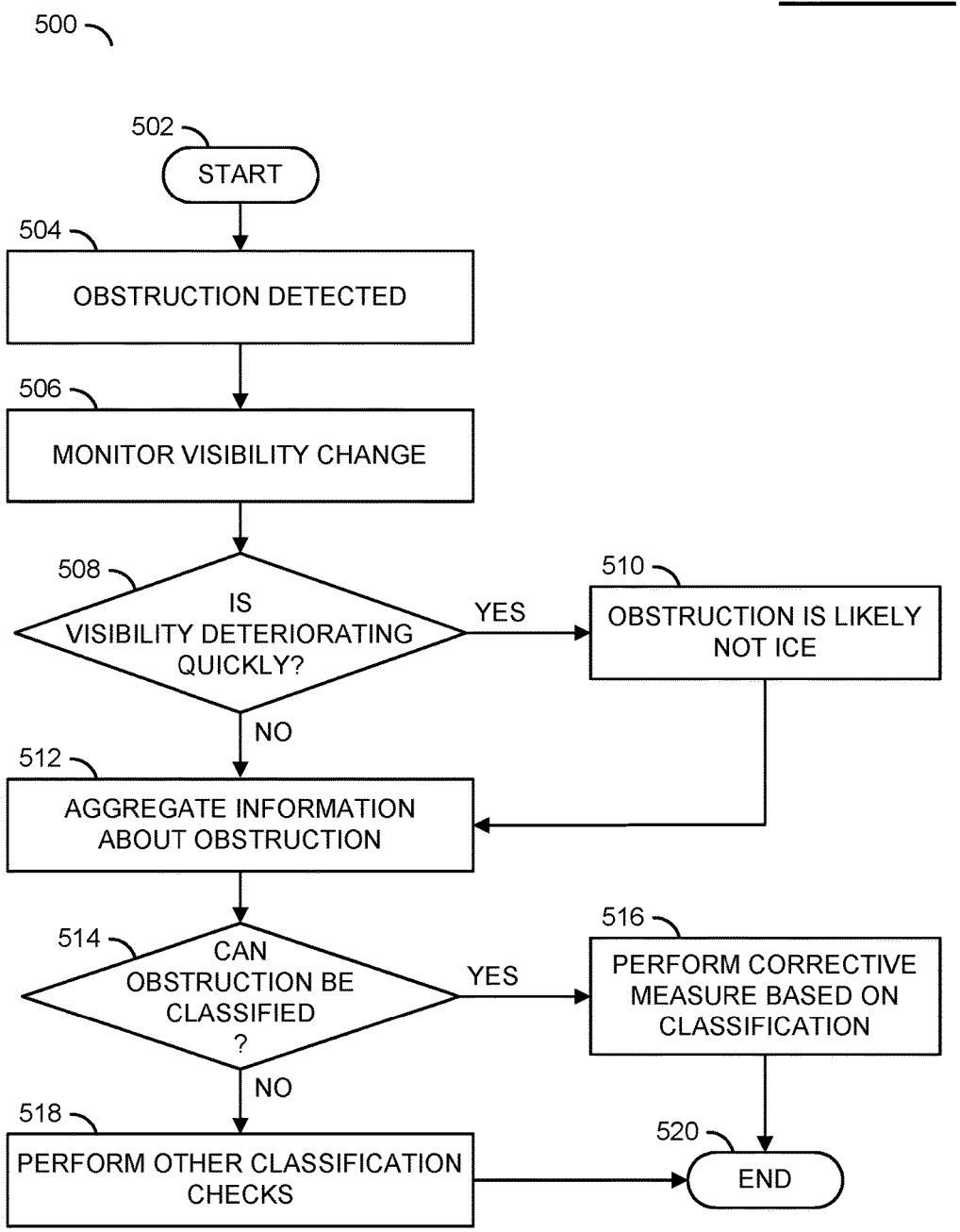
FIG. 10 is a flow diagram illustrating an example of classifying a type of obstruction based on a speed of visibility deterioration check.

Referring to FIG. 10, a method (or process) 500 is shown. The method 500 may be an example of classifying a type of obstruction based on a speed of visibility deterioration check. The method 500 generally comprises a step (or state) 502, a step (or state) 504, a step (or state) 506, a decision step (or state) 508, a step (or state) 510, a step (or state) 512, a decision step (or state) 514, a step (or state) 516, a step (or state) 518, and a step (or state) 520. The steps 502-520 may be performed by the processor 106 in response to computer executable instructions stored in the memory.

The state 502 may start the method 500. In the state 504, the camera system 100 may detect one or more of the obstructions 156a-156n. The state 506 may monitor visibility changes of the obstructions 156a-156n in the signal VIDEO. Next, the method 500 may move to the decision state 508.

If the decision state 508 determines the visibility is deteriorating quickly, the method 500 may move to the state 510. In the state 510, the classification performed by the processor 106 may determine the obstructions 156a-156n are not likely to be ice (e.g., the confidence level associated with ice may be decreased). Next, the method 500 may move to the state 512. If the decision state 508 determines the visibility is not deteriorating quickly, the method 500 may move to the state 512 (e.g., the confidence level associated with ice may be increased).

The state 512 may aggregate information about the obstructions 156a-156n (e.g., the processor 106 may aggregate information from one or more checks performed as described in FIGS. 9-13). Next, the method 500 may move to the decision state 514. If the decision state 514 determines the obstructions 156a-156n can be classified, the method 500 may move to the state 516. The state 516 may perform one or more of the corrective measures 152a-152n based on the classification. Next, the method 500 may move to the state 520. If the decision state 514 determines the obstructions 156a-156n cannot be classified, the method 500 may move to the state 518. The state 518 may perform other classification checks. Next, the method 500 may end at the state 520.

Figure 11:
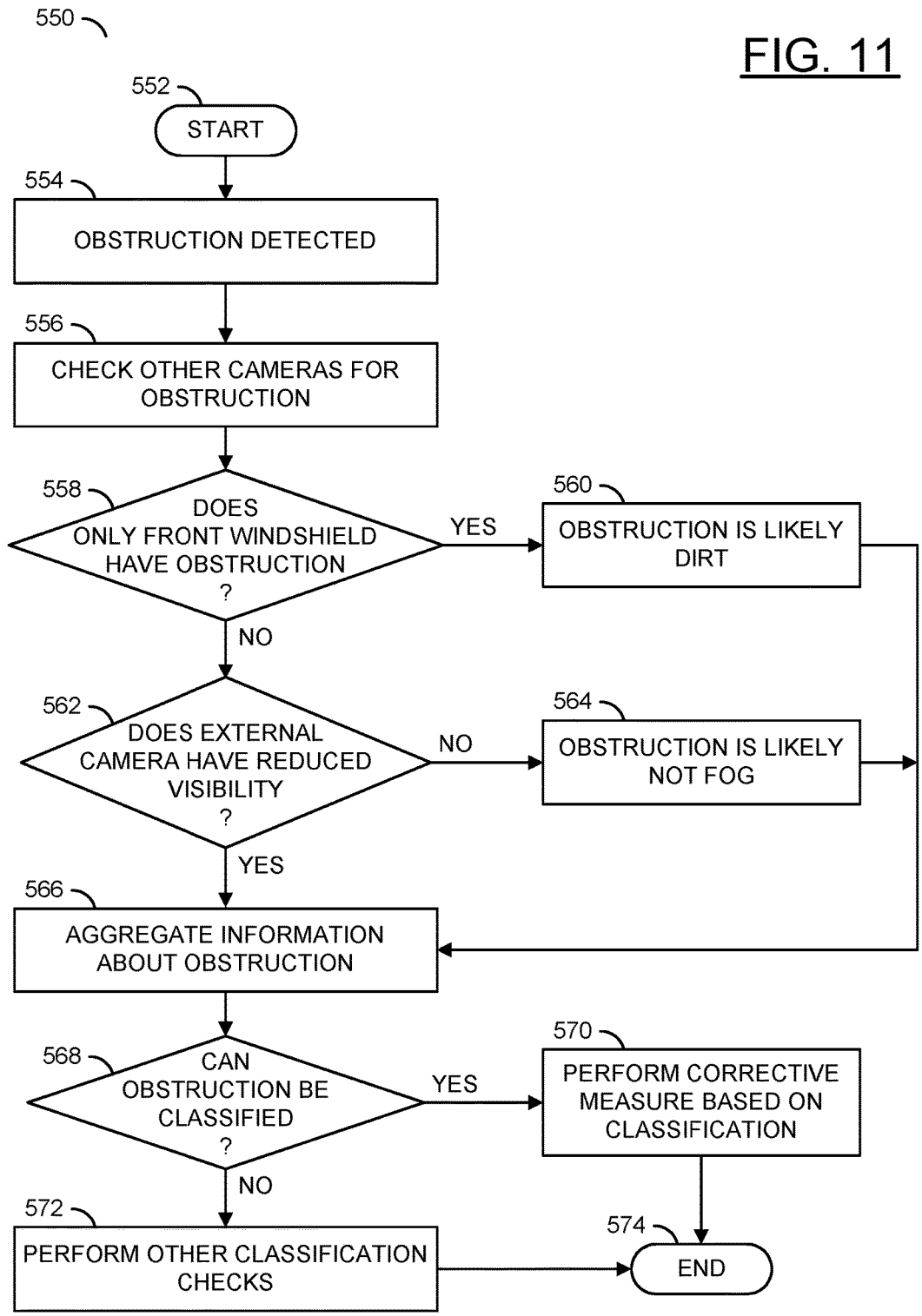
FIG. 11 is a flow diagram illustrating an example of classifying a type of obstruction based on an information check from other windows and cameras.

The condition on one or more windshields/windows may be used to determine a particular corrective measure to evoke. The camera system 100 in the vehicle 50 may be configured to see and use information from multiple windows (e.g., the windows 160, 170, 180, etc.) to calculate multiple frames 150. For example, if only the front windshield 160 does not provide good visibility, the cause of reduced visibility (e.g., the obstruction) may likely be dirt. The external camera 200 (such as rear view cameras, surround view cameras, etc.) may be used to compare. For example, if the visibility of the external camera 200 is much better, then a classification of fog and/or poor visibility may be unlikely. Referring to FIG. 11, a method (or process) 550 is shown.

The method 550 may be an example of classifying a type of obstruction based on an information check from other windows and cameras. The method 550 generally comprises a step (or state) 552, a step (or state) 554, a step (or state) 556, a decision step (or state) 558, a step (or state) 560, a decision step (or state) 562, a step (or state) 564, a step (or state) 566, a decision step (or state) 568, a step (or state) 570, a step (or state) 572, and a step (or state) 574. The steps 552-574 may be performed by the processor 106 in response to computer executable instructions stored in the memory 108.

The state 552 may start the method 550. In the state 554, the camera system 100 may detect one or more of the obstructions 156a-156n. The state 556 may check other cameras (e.g., the external camera 200) and/or other video frames (e.g., the rear window video frame 150' and/or the side window video frame 150") for obstructions. Next, the method 550 may move to the decision state 558.

If the decision state 558 determines only the front windshield 160 has the obstructions 156a-156n, the method 560 may move to the state 560. In the state 560, the classification performed by the processor 106 may determine the obstructions 156a-156n are likely to be dirt (e.g., the confidence level associated with dirt may be increased). Next, the method 550 may move to the state 566. If the decision state 558 determines that the windshield 160 is not the only window that has obstructions, the method 550 may move to the decision state 562 (e.g., the confidence level associated with dirt may be decreased and/or the confidence level with other types of obstructions may be adjusted).

If the decision state 562 determines that the external camera 200 does not have reduced visibility, the method 550 may move to the state 564. In the state 564, the classification performed by the processor 106 may determine the obstructions 156a-156n are not likely to be fog (e.g., the confidence level associated with fog may be decreased). Next, the method 550 may move to the state 566. If the decision state 562 determines that the external camera does have reduced visibility, the method 550 may move to the state 566 (e.g., the confidence level associated with fog may be increased).

The state 566 may aggregate information about the obstructions 156a-156n (e.g., the processor 106 may aggregate information from one or more checks performed as described in FIGS. 9-13). Next, the method 550 may move to the decision state 568. If the decision state 568 determines the obstructions 156a-156n can be classified, the method 550 may move to the state 570. The state 570 may perform one or more of the corrective measures 152a-152n based on the classification. Next, the method 550 may move to the state 574. If the decision state 568 determines the obstructions 156a-156n cannot be classified, the method 550 may move to the state 572. The state 572 may perform other classification checks. Next, the method 550 may end at the state 574.

Figure 12:
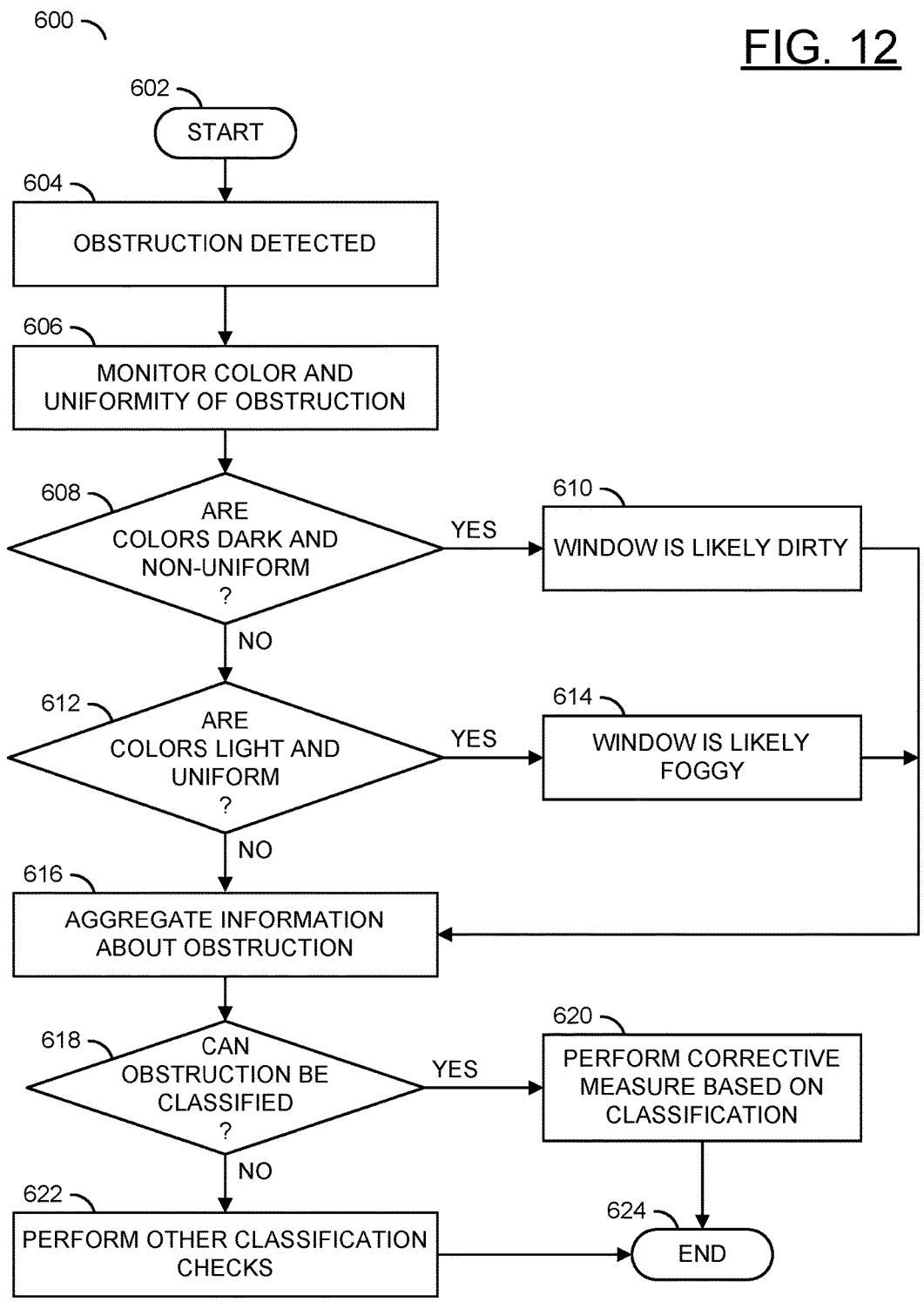
FIG. 12 is a flow diagram illustrating an example of classifying a type of obstruction based on a color and uniformity of the obstruction check.

Referring to FIG. 12, a method (or process) 600 is shown. The method 600 may be an example of classifying a type of obstruction based on a color and uniformity of the obstruction check. The method 600 generally comprises a step (or state) 602, a step (or state) 604, a step (or state) 606, a decision step (or state) 608, a step (or state) 610, a decision step (or state) 612, a step (or state) 614, a step (or state) 616, a decision step (or state) 618, a step (or state) 620, a step (or state) 622, and a step (or state) 624. The steps 602-624 may be performed by the processor 106 in response to computer executable instructions stored in the memory 108.

The state 602 may start the method 600. In the state 604, the camera system 100 may detect one or more of the obstructions 156a-156n. The state 606 may monitor color and/or uniformity of the obstructions 156a-156n in the signal VIDEO. Next, the method 600 may move to the decision state 608.

If the decision state 608 determines the colors of the obstructions 156a-156n are dark and non-uniform, the method 600 may move to the state 610. In the state 610, the classification performed by the processor 106 may determine the obstructions 156a-156n are likely to be dirt on the window 160 (e.g., the confidence level associated with dirt may be increased). Next, the method 600 may move to the state 616. If the decision state 608 determines the colors of the obstructions 156a-156n are not dark and non-uniform, the method 600 may move to the decision state 612 (e.g., the confidence level associated with dirt may be decreased).

If the decision state 612 determines the colors of the obstructions 156a-156n are light and uniform, the method 600 may move to the state 614. In the state 614, the classification performed by the processor 106 may determine the obstructions 156a-156n are likely to be a foggy window 160 (e.g., the confidence level associated with foggy windshield may be increased). Next, the method 600 may move to the state 616. If the decision state 612 determines the colors of the obstructions 156a-156n are not light and uniform, the method 600 may move to the state 616 (e.g., the confidence level associated with a foggy windshield may be decreased).

The state 616 may aggregate information about the obstructions 156a-156n (e.g., the processor 106 may aggregate information from one or more checks performed as described in FIGS. 9-13). Next, the method 600 may move to the decision state 618. If the decision state 618 determines the obstructions 156a-156n can be classified, the method 600 may move to the state 620. The state 620 may perform one or more of the corrective measures 152a-152n based on the classification. Next, the method 600 may move to the state 624. If the decision state 618 determines the obstructions 156a-156n cannot be classified, the method 600 may move to the state 622. The state 622 may perform other classification checks. Next, the method 600 may end at the state 624.

A number of active detection measures may be used. The active detection measures may comprise activating one or more of the corrective measures 152a-152n to help perform a classification of the type of the obstructions 156a-156n. For example, activating and/or flashing headlights (or high beams) may be used as one of the active detection measures. If the obstruction is outside fog, the camera capture device 102 may be able to detect a reflection in response to activating and/or flashing the headlights 152j. Wipers and/or washer fluid may also be used as an active detection measure. A notable change in visibility may be measured when dealing with dirt and/or frozen glass. Using A/C to heat the windshield above dew point may also be implemented as an active detection measure. If "foggy" glass is sensed, the visibility should rapidly improve with A/C.

Figure 13:
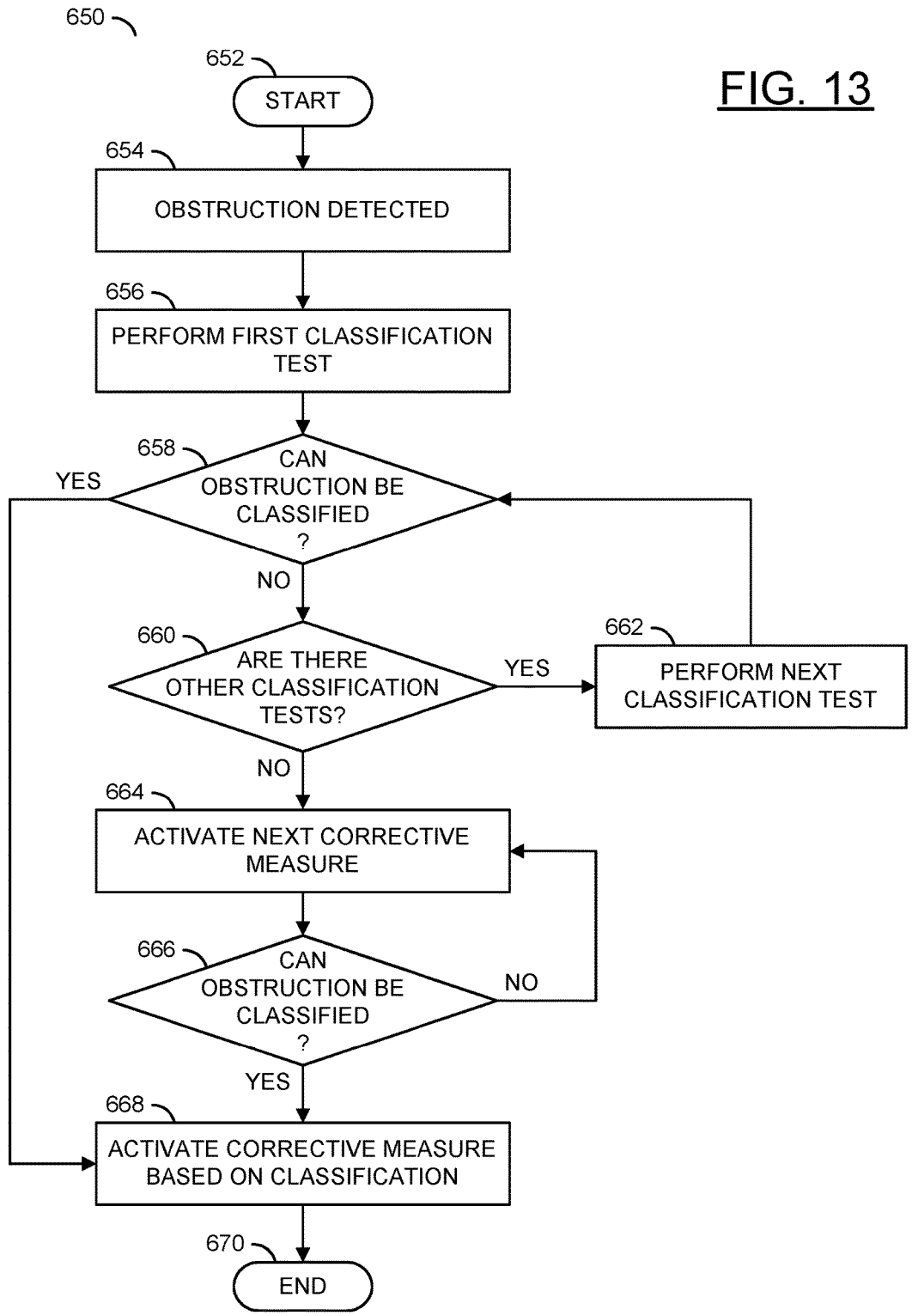
FIG. 13 is a flow diagram illustrating an example of classifying a type of obstruction based on responses to corrective measures.

Referring to FIG. 13, a method (or process) 650 is shown. The method 650 may be an example of classifying a type of obstruction based on responses to corrective measures. The method 650 generally comprises a step (or state) 652, a step (or state) 654, a step (or state) 656, a decision step (or state) 658, a decision step (or state) 660, a step (or state) 662, a step (or state) 664, a decision step (or state) 666, a step (or state) 668, and a step (or state) 670. The steps 652-670 may be performed by the processor 106 in response to computer executable instructions stored in the memory 108.

The state 652 may start the method 650. In the state 654, the camera system 100 may detect one or more of the obstructions 156a-156n. Next, the state 656 may perform a first classification test (or check, such as one of the checks described in FIGS. 9-12 and/or other checks). Next, the method 650 may move to the decision state 658.

If the decision state 658 determines the obstructions 156a-156n can be classified, the method 650 may move to the state 668. If the decision state 658 determines the obstructions 156a-156n cannot be classified, the method 650 may move to the decision state 660. If the decision state 660 determines there are other classification tests, the method 650 may move to the state 662. The state 662 may perform a next classification test (or check, such as one of the checks described in FIGS. 9-12). Next, the method 650 may return to the decision state 658. If the decision state 660 determines there are no other classification tests, the method 650 may move to the state 664.

The state 664 may activate a next one of the corrective measures 152a-152n. Next, the method 650 may move to the decision state 666. If the decision state 666 determines the obstructions 156a-156n cannot be classified based on the response to the corrective measure activated, the method 650 may return to the state 664. If the decision state 666 determines the obstructions 156a-156n can be classified based on the response to the corrective measure activated, the method 650 may move to the state 668. The state 668 may activate one or more of the corrective measures 152a-152n based on the classification. Next, the method 650 may end at the state 670.

The camera system 100 may perform one or more of the checks described in FIGS. 9-13. Other checks may be performed. The checks performed, the types of obstructions tested in each check and/or the changes in confidence level in response to each check may be varied according to the design criteria of a particular implementation. The checks may be performed to rule out and/or confirm the type of obstruction (e.g., increase and/or decrease a confidence level associated with one or more types of obstructions). Each of the individual checks or cues may not provide certainty for classifying a particular obstruction. Each of the checks may provide evidence that may be used to diagnose the cause of the reduction of visibility.

Results from each of the checks may be determined by the processor 106 and/or stored in the memory 108 (e.g., in the data storage portion 118). The results from each of the checks may be aggregated by updating the stored information (e.g., to take into account various data received from each of the checks). In one example, the aggregated information may be a single value for each type of obstruction (e.g., a confidence level value). In another example, each type of obstruction may have many associated values based on the evidence received from the checks. The processing and/or storage of the aggregated results may be varied according to the design criteria of a particular implementation.

In aggregate, the evidence received in response to the checks may provide the processor 106 with enough information to classify the type of obstruction and/or activate a corrective measure. The response of the obstruction to the corrective measure may also provide feedback that may be used as evidence of the type of obstruction. For example, the obstruction may be continually and/or periodically monitored to classify the type of obstruction and/or monitored to ensure safe visibility. The corrective measures 152a-152n may be modified based on the feedback.

The particular corrective measures 152a-152n the vehicle 50 uses may depend on the particular problem determined (e.g., the classification of the type of obstruction). The particular corrective measure used may be discontinued as soon as visibility improves (e.g., as judged by computer vision process run on the processor 106). In case of "foggy" glass, the processor 106 may constantly keep the windshield 160 at a temperature above the dew point. Since a feedback mechanism is implemented, the processor 106 may correct one or more assumptions regarding dew point based on whether the windshield 160 becomes foggy again. In an example when outside fog is detected, fog lights may be turned on automatically.

Detection and/or corrective measures may start to be applied as soon as the driver turns on the vehicle 50. In one example, approaching the vehicle 50 (where the vehicle detects the key fob), inserting ignition key, using external app, etc., may start the detection and/or correction process (e.g., an activation signal). In some embodiments, automatically starting the process for a particular time of day and/or a schedule (e.g., before work so ice can be removed before the driver has to manually scrape the ice) may provide additional convenience to the driver.

The processor 106 may be used to differentiate between various types of obstructions (e.g., classify the obstructions 156a-156n). For example, ice and/or condensation may differ in color histogram. In another example, condensation and/or fog may differ in the way they reflect headlights, respond to A/C activation, etc. The apparatus 100 may implement an integrated process that combines differentiating and/or attempting to fix various obstructions iteratively. For example, turning on the headlights briefly may be used to test the "hypothesis" that there is fog outside. In another example, spraying water on the windshield 160 may be a corrective measure used to test the "hypothesis" that there is ice formed on the windshield 160 (the water might be both the test and a part of the solution).

The corrective measures 152a-152n may be implemented as part of a "diagnosis" (e.g., classification of the obstructions 156a-156n). The response of the obstructions 156a-156n to the corrective measures 152a-152n may increase or decrease a confidence level of the classification. For example, applying heat to increase the temperature of the inside of the windshield 160 above the dew point may increase visibility. The response of the obstruction (e.g., the fog fading) to the corrective measure may increase the confidence level (e.g., provide a confirmation) of the classification.

The apparatus 100 may provide automatic cleaning, defogging and/or de-icing of windshields/windows based on visual information from cameras complemented by sensor data. In one example, fog lights may be turned on based on visual information from cameras complemented by sensor data. A feedback loop for detecting whether the problem is gone after applying a corrective measure and/or modifying the behavior accordingly in response to the corrective measures may be used to minimize distractions. The apparatus 100 may provide the classification of information to determine a speed of visibility deterioration.

The functions performed by the diagrams of FIGS. 6-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:
1. An apparatus comprising:
an interface configured to receive (a) a video signal based on a targeted view in a vehicle and (b) one or more status signals from one or more sensors of said vehicle; and
a processing circuit configured to (A) analyze said video signal received from said interface and (B) detect a type of obstruction of a window of said vehicle visible in said video signal in response to (i) a classification of information in said video signal and (ii) one or more of said status signals, wherein said processing circuit (a) determines a confidence level for said type of obstruction, (b) activates one or more corrective measures when said confidence level is above a pre-defined threshold and (c) adjusts said confidence level based on a response of said obstruction to said corrective measures.

2. The apparatus according to claim 1, wherein one of said corrective measures comprises activating a fog lamp.

3. The apparatus according to claim 1, wherein (A) said processing circuit is further configured to generate a control signal used to initiate one or more of said corrective measures for said window of said vehicle based on said type of obstruction, (B) said corrective measures comprise at least one of automatic cleaning of said window, defogging of said window and de-icing said window and (C) said corrective measures are used to test a hypothesis of the type of obstruction.

4. The apparatus according to claim 1, wherein said processing circuit is further configured to (i) determine whether said corrective measure has removed said obstruction and (ii) if said corrective measure has not removed said obstruction, (a) receive feedback on said response of said obstruction to said corrective measure to adjust said confidence level and (b) adjust a diagnosis of said type of obstruction based on said feedback.

5. The apparatus according to claim 1, wherein (i) said apparatus further comprises a memory, (ii) said memory comprises a lookup table comprising precalculated values and (iii) said confidence level for said type of obstruction is further determined based on a comparison of said status signals to said values in said lookup table.

6. The apparatus according to claim 1, wherein said information in said video signal used by said processing circuit to perform said classification comprises at least one of (a) a number of pixels, (b) an arrangement of pixels of objects detected by said processing circuit and (c) a color histogram.

7. The apparatus according to claim 1, wherein said processing circuit is configured to automatically initiate said detection in response to at least one of (i) a particular time of day before a driver is present and (ii) an activation signal received using an external app.

8. The apparatus according to claim 1, wherein said classification of said information in said video signal comprises at least one of (i) determining a change in visibility of said obstruction, (ii) determining a uniformity of said obstruction, (iii) a comparison of said obstruction of said window and another obstruction of a windshield of said vehicle and (iv) a change of said information in said video signal in response to one or more of said corrective measures initiated by said processing circuit.

9. The apparatus according to claim 1, wherein (i) said status signals comprise at least one of a temperature reading, a dew point and a humidity level, and (ii) said confidence level is determined by at least one of: detecting whether colors of said obstruction in said video signal have shifted from expected channels, detecting whether a temperature of an inside of said window is above a dew point, detecting whether a temperature outside of said vehicle is above freezing, determining a speed of visibility deterioration caused by said obstruction, determining whether other windows of said vehicle have an obstruction similar to said obstruction, detecting a color of said obstruction and detecting a uniformity of said obstruction.

10. The apparatus according to claim 1, wherein said classification of said information comprises at least one of (a) detecting a reflection in response to activating headlights of said vehicle, (b) a change in visibility in response to at least one of (i) wipers and (ii) washer fluid and (c) a change in visibility in response to a temperature change.

11. A method for responding to visibility obstructions, comprising the steps of:
(A) receiving a video signal based on a targeted view in a vehicle;
(B) receiving one or more status signals from one or more sensors of said vehicle;
(C) analyzing said video signal;
(D) detecting a type of obstruction of a window of said vehicle visible in said video signal in response to (i) a classification of information in said video signal and (ii) one or more of said status signals,
(E) determining a confidence level for said type of obstruction;
(F) activating one or more corrective measures when said confidence level is above a pre-defined threshold; and
(G) adjusting said confidence level based on a response of said obstruction to said corrective measures.

12. The method according to claim 11, wherein one of said corrective measures comprises activating a fog lamp.

13. The method according to claim 11, further comprising the step of:
receiving a second video signal from a camera external to said vehicle, wherein said classification of said information comprises comparing a visibility in said second video signal to said obstruction detected in said video signal.

14. The method according to claim 11, further comprising the steps of:
receiving a second video signal from a camera configured to capture a front windshield of said vehicle; and
detecting a second obstruction on said front windshield visible in said second video signal based on said type of obstruction in said window, wherein said window comprises at least one of a rear windshield and side window of said vehicle.

15. The method according claim 11, further comprising the steps of:
generating a control signal used to initiate one or more of said corrective measures for said window of said vehicle based on said type of obstruction; and
testing a hypothesis of said type of obstruction using said corrective measures, wherein said corrective measures comprise at least one of automatic cleaning of said window, defogging of said window and de-icing said window.

16. The method according to claim 11, further comprising the steps of:
determining whether said corrective measure has removed said obstruction; and
if said corrective measure has not removed said obstruction, (a) receiving feedback on said response of said obstruction to said corrective measure to adjust said confidence level and (b) adjusting a diagnosis of said type of obstruction based on said feedback.

17. The method according to claim 11, wherein said information in said video signal used to perform said classification comprises at least one of (a) a number of pixels, (b) an arrangement of pixels of objects detected and (c) a color histogram.

18. The method according to claim 11, further comprising the steps of:
storing a lookup table comprising precalculated values;
comparing said status signals to said values in said lookup table; and
adjusting said confidence level for said type of obstruction in response to said comparison.

19. The method according to claim 11, wherein said classification of said information in said video signal comprises at least one of (i) determining a change in visibility of said obstruction, (ii) determining a uniformity of said obstruction, (iii) a comparison of said obstruction of said window and another obstruction of a windshield of said vehicle and (iv) a change of said information in said video signal in response to one or more of said corrective measures.

20. The method according to claim 11, wherein (i) said status signals comprise at least one of a temperature reading, a dew point and a humidity level, and (ii) said confidence level is determined by at least one of: detecting whether colors of said obstruction in said video signal have shifted from expected channels, detecting whether a temperature of an inside of said window is above a dew point, detecting whether a temperature outside of said vehicle is above freezing, determining a speed of visibility deterioration caused by said obstruction, determining whether other windows of said vehicle have an obstruction similar to said obstruction, detecting a color of said obstruction and detecting a uniformity of said obstruction.

\* \* \* \* \*